US012582912B2

(12) United States Patent
Maeno et al.

(10) Patent No.: US 12,582,912 B2
(45) Date of Patent: Mar. 24, 2026

(54) STORAGE MEDIUM, INFORMATION PROCESSING SYSTEM, INFORMATION PROCESSING APPARATUS, AND GAME PROCESSING METHOD

(71) Applicant: Nintendo Co., Ltd., Kyoto (JP)

(72) Inventors: Ryuju Maeno, Kyoto (JP); Yuya Sato, Kyoto (JP); Tadashi Sakamoto, Kyoto (JP); Naoki Fukada, Kyoto (JP); Haruya Uematsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 262 days.

(21) Appl. No.: 18/491,447

(22) Filed: Oct. 20, 2023

(65) Prior Publication Data

US 2024/0261688 A1 Aug. 8, 2024

(30) Foreign Application Priority Data

Feb. 2, 2023 (JP) ................................. 2023-014714
Feb. 2, 2023 (JP) ................................. 2023-014715

(51) Int. Cl.
| | |
|---|---|
| A63F 13/53 | (2014.01) |
| A63F 13/525 | (2014.01) |
| A63F 13/533 | (2014.01) |
| A63F 13/537 | (2014.01) |
| A63F 13/69 | (2014.01) |

(52) U.S. Cl.
CPC ............ *A63F 13/69* (2014.09); *A63F 13/525* (2014.09); *A63F 13/53* (2014.09); *A63F 13/533* (2014.09); *A63F 13/537* (2014.09)

(58) Field of Classification Search
None
See application file for complete search history.

(56) References Cited

U.S. PATENT DOCUMENTS

| | | | |
|---|---|---|---|
| 2019/0060763 A1 | 2/2019 | Arai et al. | |
| 2022/0297003 A1 | 9/2022 | Gu et al. | |
| 2022/0410008 A1 | 12/2022 | Ochi | |
| 2023/0001296 A1* | 1/2023 | Miyashita | A63F 13/52 |

(Continued)

FOREIGN PATENT DOCUMENTS

| | | |
|---|---|---|
| JP | 2005-305043 | 11/2005 |
| JP | 2015-051138 | 3/2015 |
| JP | 2018-102745 | 7/2018 |

OTHER PUBLICATIONS

"The Legend of Zelda: Breath of the Wild", [online], Nintendo of America Inc., [searched on Jan. 12, 2023], internet URL: https://www.zelda.com/breath-of-the-wild/ (4 pages).

(Continued)

*Primary Examiner* — Damon J Pierce
(74) *Attorney, Agent, or Firm* — Nixon & Vanderhye, PC

(57) ABSTRACT

An example of an information processing system generates a composite equipment item object in which an equipment item object and an item object are composited, in response to an instruction. The information processing system generates, as a name of the composite equipment item object, a name composed of a first part, a second part following the first part, and a third part following the second part, based on a combination of the item object and the equipment item object. The information processing system causes a player character to possess the composite equipment item object.

16 Claims, 32 Drawing Sheets

| PRIORITY ORDER | PATTERN CONDITION | NAMING RULE |
|---|---|---|
| 1 | PROPERTY IS "SPECIAL EQUIPMENT" | SPECIFIC NAME |
| 2 | MATERIAL ITEM IS EQUIPMENT ITEM | "MATERIAL NAME" "-ATTACHED" "EQUIPMENT TYPE NAME" |
| 3 | PROPERTY IS "RANGE EXPANSION" | "MATERIAL NAME" "POST-COMPOSITION NAME" |
| 4 | PROPERTY IS "MAGIC ATTACK" AND "BLUNT INSTRUMENT AFTER COMPOSITION" | "MATERIAL NAME" "-TIPPED" "EQUIPMENT TYPE NAME" |
| 5 | PROPERTY IS "MAGIC ATTACK" | "MATERIAL NAME" "-TIPPED" "EQUIPMENT TYPE NAME" |
| 6 | PROPERTY IS "CRUSH" AND TYPE IS "SPEAR" | "MATERIAL NAME" "POST-COMPOSITION NAME (SPEAR)" |
| 7 | PROPERTY IS "CRUSH" AND "THROWING" | "MATERIAL NAME" "EQUIPMENT TYPE NAME" |
| 8 | PROPERTY IS "CRUSH" | "MATERIAL NAME" "POST-COMPOSITION NAME (OTHER THAN SPEAR)" |
| 9 | PROPERTY IS "EXPLOSION" AND "BLUNT INSTRUMENT AFTER COMPOSITION" | "PROPERTY NAME" "POST-COMPOSITION NAME" |
| 10 | PROPERTY IS "EXPLOSION" | "PROPERTY NAME" "EQUIPMENT TYPE NAME" |
| 11 | PROPERTY IS "THROWING" | "MATERIAL NAME" "EQUIPMENT TYPE NAME" |
| 12 | PROPERTY IS "LIGHTING" | "MATERIAL NAME" "POST-COMPOSITION NAME" |
| 13 | PROPERTY IS "CUTTING" | "MATERIAL NAME" "POST-COMPOSITION NAME" |
| 14 | PROPERTY IS "BLUNT INSTRUMENT" | "MATERIAL NAME" "POST-COMPOSITION NAME" |
| 15 | PROPERTY IS "EDGED TOOL" | "MATERIAL NAME" "POST-COMPOSITION NAME" |

(56)         References Cited

U.S. PATENT DOCUMENTS

2023/0191257 A1 *   6/2023   Ide ........................ A63F 13/822
                                                    463/23
2025/0205600 A1     6/2025   Miyanaga et al.

OTHER PUBLICATIONS

Yamamoto et al., U.S. Appl. No. 18/491,483, filed Oct. 20, 2023.
Mar. 27, 2024 Office Action issued in Japanese Patent Application
No. 2023-014714, pp. 1-4 [machine translation included].
[Apex Legends] for beginners: An explanation of an attachment that
can be attached to a weapon, Charage! [online], Oct. 19, 2021,
Internet  URL:lhttps://chara.ge/apex-legends/beginner-weapon-
attachment [Searched on Mar. 15, 2024] pp. 1-25.

* cited by examiner

ATTACHABLE AND DETACHABLE

ATTACHABLE AND DETACHABLE

Fig.13

| MATERIAL ITEM | PROPERTY | POST-COMPOSITION NAME | | |
|---|---|---|---|---|
| | | ONE-HANDED SWORD | TWO-HANDED SWORD | SPEAR |
| RUBY | MAGIC ATTACK | ROD | ROD | ROD |
| DRAGON'S TAIL | RANGE EXPANSION | WHIP | WHIP | WHIP |
| BUNDLE OF FIREWOOD | LIGHTING | TORCH | TORCH | TORCH |
| DRAGON'S HORN | CRUSH | HAMMER | HAMMER | SLEDGE |
| GOBLIN'S HORN | CRUSH (NON-HAMMER) | SMASHER | POUNDER | PULVERIZER |
| GOLEM'S HORN | EDGED TOOL | REAPER | BLADE | SPEAR |
| POINTED STONE | CUTTING | AXE | TWO-HANDED AXE | HALBERD |
| LOG | BLUNT INSTRUMENT | CLUB | BAT | SPEAR |

Fig.15

| PRIORITY ORDER | PATTERN CONDITION | NAMING RULE |
|---|---|---|
| 1 | PROPERTY IS "SPECIAL EQUIPMENT" | SPECIFIC NAME |
| 2 | MATERIAL ITEM IS EQUIPMENT ITEM | "MATERIAL NAME" "-ATTACHED" "EQUIPMENT TYPE NAME" |
| 3 | PROPERTY IS "RANGE EXPANSION" | "MATERIAL NAME" "POST-COMPOSITION NAME" |
| 4 | PROPERTY IS "MAGIC ATTACK" AND "BLUNT INSTRUMENT AFTER COMPOSITION" | "MATERIAL NAME" "-TIPPED" "EQUIPMENT TYPE NAME" |
| 5 | PROPERTY IS "MAGIC ATTACK" | "MATERIAL NAME" "-TIPPED" "EQUIPMENT TYPE NAME" |
| 6 | PROPERTY IS "CRUSH" AND TYPE IS "SPEAR" | "MATERIAL NAME" "POST-COMPOSITION NAME (SPEAR)" |
| 7 | PROPERTY IS "CRUSH" AND "THROWING" | "MATERIAL NAME" "EQUIPMENT TYPE NAME" |
| 8 | PROPERTY IS "CRUSH" | "MATERIAL NAME" "POST-COMPOSITION NAME (OTHER THAN SPEAR)" |
| 9 | PROPERTY IS "EXPLOSION" AND "BLUNT INSTRUMENT AFTER COMPOSITION" | "PROPERTY NAME" "POST-COMPOSITION NAME" |
| 10 | PROPERTY IS "EXPLOSION" | "PROPERTY NAME" "EQUIPMENT TYPE NAME" |
| 11 | PROPERTY IS "THROWING" | "MATERIAL NAME" "EQUIPMENT TYPE NAME" |
| 12 | PROPERTY IS "LIGHTING" | "MATERIAL NAME" "POST-COMPOSITION NAME" |
| 13 | PROPERTY IS "CUTTING" | "MATERIAL NAME" "POST-COMPOSITION NAME" |
| 14 | PROPERTY IS "BLUNT INSTRUMENT" | "MATERIAL NAME" "POST-COMPOSITION NAME" |
| 15 | PROPERTY IS "EDGED TOOL" | "MATERIAL NAME" "POST-COMPOSITION NAME" |

Fig.25

PATTERN: PROPERTY IS "SPECIAL EQUIPMENT"

| MATERIAL ITEM | RUBY | |
|---|---|---|
| PROPERTY | MAGIC ATTACK | |
| | POST-COMPOSITION NAME: ROD | |

| EQUIPMENT ITEM | ○○ |
|---|---|
| PROPERTY | SPECIAL EQUIPMENT |

| NAMING RULE | SPECIFIC NAME |
|---|---|
| COMPOSITE EQUIPMENT ITEM NAME | ○○ |

Fig.26
(a) PREPARE THREE-DIMENSIONAL MODELS OF MATERIAL ITEM AND EQUIPMENT ITEM
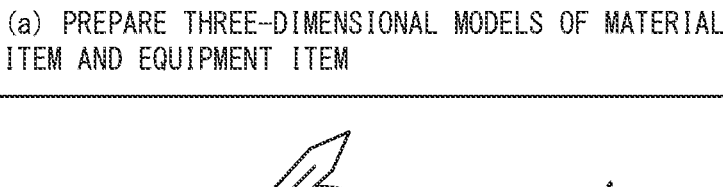
(b) GENERATE THREE-DIMENSIONAL MODEL OF COMPOSITE EQUIPMENT ITEM
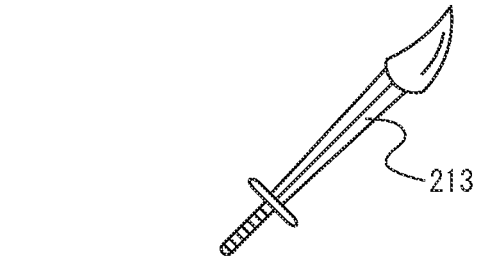
(c) CAPTURE IMAGE OF THREE-DIMENSIONAL MODEL TO GENERATE ICON IMAGE
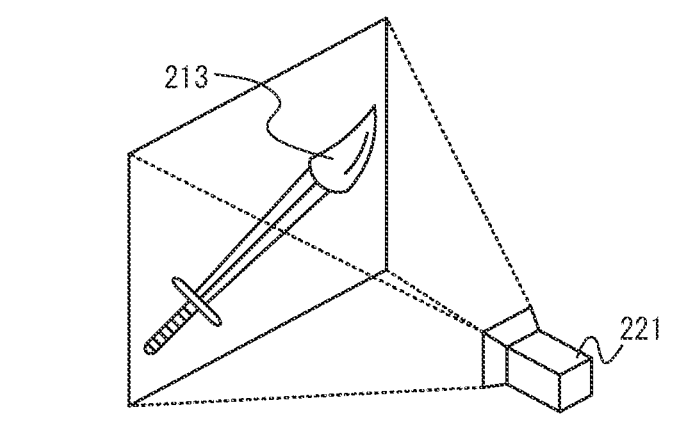

IRON SWORD

SWORD MADE OF IRON

Fig.29

| GAME PROGRAM |
| --- |
| MATERIAL ITEM DATA |
| EQUIPMENT ITEM DATA |
| CORRESPONDENCE INFORMATION DATA |
| MODEL DATA |
| ICON DATA |

GAME PROCESSING DATA

| POSSESSED ITEM DATA |
| --- |

COMPOSITE ITEM DATA

| COMPOSITE NAME DATA |
| --- |
| COMPOSITE ICON DATA |

Fig.32

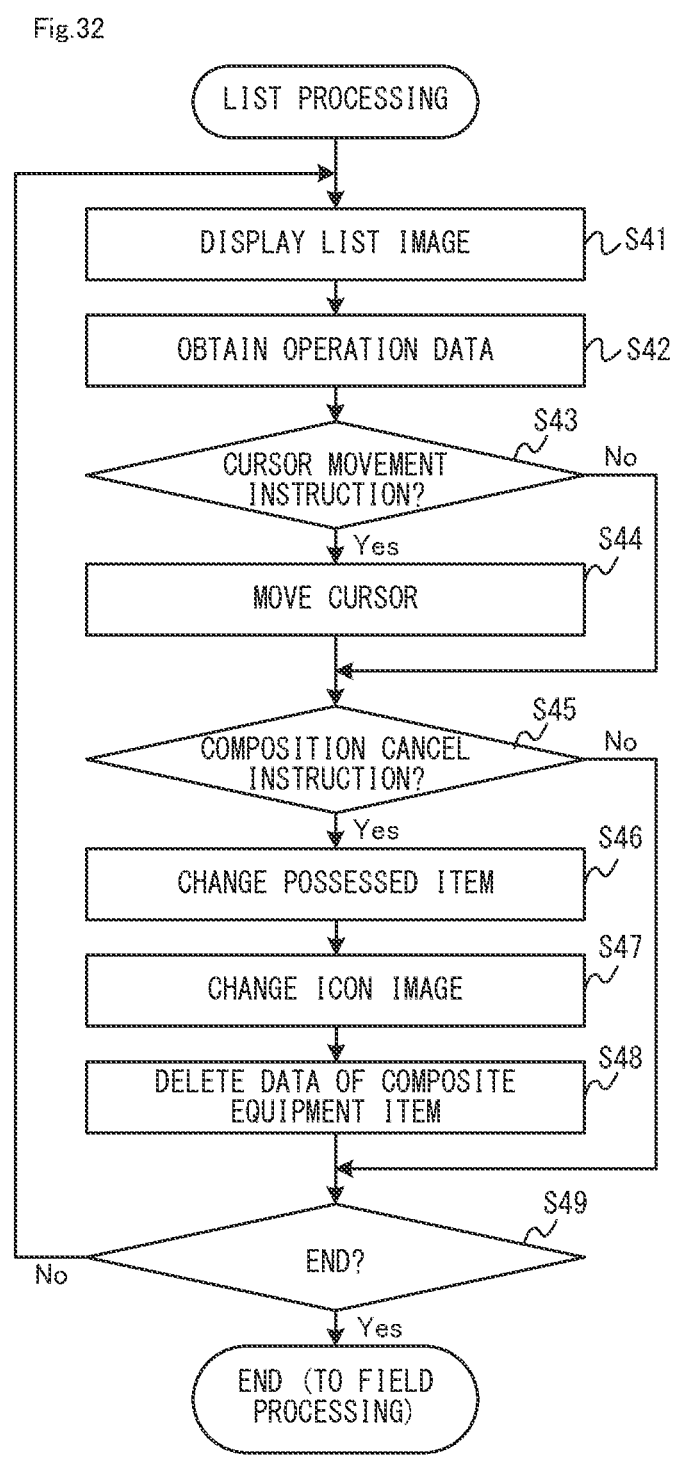

```
        ┌──────────────────────┐
        │   LIST PROCESSING    │
        └──────────────────────┘
                   │
                   ▼
        ┌──────────────────────┐
        │  DISPLAY LIST IMAGE  │───S41
        └──────────────────────┘
                   │
                   ▼
        ┌──────────────────────┐
        │ OBTAIN OPERATION DATA│───S42
        └──────────────────────┘
                   │
                   ▼
                  S43
            ╱──────────────╲        No
           ╱ CURSOR MOVEMENT ╲──────────┐
           ╲  INSTRUCTION?   ╱          │
            ╲──────────────╱            │
                   │ Yes          S44   │
                   ▼                    │
        ┌──────────────────────┐        │
        │     MOVE CURSOR      │        │
        └──────────────────────┘        │
                   │◄───────────────────┘
                   ▼
                  S45
            ╱──────────────╲        No
           ╱COMPOSITION CANCEL╲────────┐
           ╲  INSTRUCTION?   ╱         │
            ╲──────────────╱           │
                   │ Yes         S46   │
                   ▼                   │
        ┌──────────────────────┐       │
        │ CHANGE POSSESSED ITEM│       │
        └──────────────────────┘       │
                   │            S47     │
                   ▼                   │
        ┌──────────────────────┐       │
        │  CHANGE ICON IMAGE   │       │
        └──────────────────────┘       │
                   │            S48     │
                   ▼                   │
        ┌──────────────────────┐       │
        │ DELETE DATA OF COMPOSITE     │
        │   EQUIPMENT ITEM     │       │
        └──────────────────────┘       │
                   │◄──────────────────┘
                   ▼
                  S49
      No    ╱──────────────╲
    ┌───────╲    END?       ╱
    │        ╲──────────────╱
    │               │ Yes
    │               ▼
    │     ┌──────────────────────┐
    │     │  END (TO FIELD       │
    │     │   PROCESSING)        │
    │     └──────────────────────┘
    └────────────(back to DISPLAY LIST IMAGE)
```

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Application No. 2023-014714 and 2023-014715, filed on Feb. 2, 2023, the entire contents of which are incorporated herein by reference.

FIELD

The present disclosure relates to a storage medium, an information processing system, an information processing apparatus, and a game processing method capable of generating items that appear in a game.

BACKGROUND AND SUMMARY

Conventionally, there are games in which various types of items appear.

It is preferable that many types of items appear in a game, but there is a limit in simply increasing the types of items in terms of a burden of development work and an increase in data. In addition, with an increase in the types of items, a labor of giving names to the respective items also increases.

Therefore, the present application discloses a storage medium, an information processing system, an information processing apparatus, and a game processing method capable of causing many types of items to appear in a game, and automatically naming the items.

(1)

An example of a non-transitory computer-readable storage medium described herein stores instructions that, when executed, cause a processor of an information processing apparatus to execute game processing comprising: controlling a player character, based on an operation input: generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality item objects present in a virtual space, the first composite equipment item object being obtained by compositing the first equipment item object and the first item object, the player character possessing the first composite equipment item object, and being able to equip and use the first composite equipment item object, each item object being associated in advance with pieces of information on at least a name of the item object and an effect at composition of the item object, each equipment item object being associated in advance with pieces of information on at least a name, a type, and performance of the equipment item object; generating, in response to the first instruction, a name composed of a first part, a second part following the first part, and a third part following the second part, as a name of the first composite equipment item object, the generating the name including, determining the first part to be a name representing the first item object, or a name representing the effect at composition of the first item object, based on a combination of the first item object and the first equipment item object, determining the second part to be a predetermined postpositional particle or a predetermined suffix added to the first part, or to be omitted, based on the combination, and determining the third part to be a name representing a type of the first equipment item object, or a name according to a combination of the effect at composition associated with the first item object and the type associated with the first equipment item object, based on the combination; and causing the player character to possess the first composite equipment item object, in response to the first instruction.

According to the configuration of the above (1), since a new composite equipment item object can be generated by compositing an item object and an equipment item object, many types of items are allowed to appear in the game. Furthermore, the composite equipment item object can be automatically named.

(2)

In configuration (1) above, the first part, the second part, and the third part may be determined based on a naming rule that is set in advance and corresponds to a pattern that matches the combination of the first item object and the first equipment item object, among a plurality of patterns that are set in advance regarding combinations of any of the pieces of information associated with the item object and any of the pieces of information associated with the equipment item object.

According to the configuration of the above (2), since the naming rule according to the combination of the original item objects can be used, an appropriate name following, for example, the property or the appearance of the composite equipment item object can be easily generated.

(3)

In configuration (2) above, the plurality of patterns may be given a priority order. The first part, the second part, and the third part may be determined based on the naming rule corresponding to a pattern that matches the combination of the first item object and the first equipment item object and is specified based on the priority order, among the plurality of patterns.

According to the configuration of the above (3), even when there are a plurality of patterns that match the combination of the original item objects, one naming rule can be determined.

(4)

In configuration (3) above, each of the plurality of patterns may be set as a pattern of a combination of the information on the effect at composition associated with the item object, and any of the pieces of information associated with the equipment item object.

According to the configuration of the above (4), the name of the composite equipment item object can be generated according to the effect at composition that is set for the original item object.

(5)

In any one of configurations (1) to (4) above, the game processing may further comprise generating an effect according to the effect at composition associated with the first item object, when the player character uses the first composite equipment item object, based on an operation input.

According to the configuration of the above (5), the name of the composite equipment item object can be generated so that the player can easily understand the effect of use of the composite equipment item object.

(6)

In any one of configurations (2) to (5) above, a first pattern and a second pattern, among the plurality of patterns, may have the same information on the effect at composition, and have different pieces of information associated with the equipment item object. The naming rules corresponding to the first pattern and the second pattern may have the same rule for determining the first part, and have different rules for determining the third part.

According to the configuration of the above (6), even when the patterns of the original item objects and the original equipment item objects are associated with the same effect at composition, it is possible to generate names with different naming rules according to the equipment item objects. Therefore, the name of the composite equipment item object is inhibited from becoming unnatural due to the equipment item object.

(7)

In any one of configurations (1) to (6) above, at least one of the plurality of equipment item objects may be able to be composited with the first equipment item object, as the first item object.

According to the configuration of the above (7), the number of generable composite equipment item objects can be increased, thereby increasing the types of items.

(8)

In any one of configurations (1) to (7) above, the game processing may further comprise displaying, in response to a second instruction based on an operation input, a list image of the equipment item objects and the composite equipment item objects which are possessed by the player character such that the name of at least a designated equipment item object or a designated composite equipment item object is displayed.

According to the configuration of the above (8), the list image allows the names of the composite equipment item objects to be presented to the player.

(9)

In configuration (8) above, the list image may be displayed such that the names of the item object and the equipment item object, which are origins of at least the designated composite equipment item object, are further included in the list image, in addition to the name of the composite equipment item object.

According to the configuration of the above (9), the list image can present, to the player, the item object and the equipment item object that are the origins of the composite equipment item object.

This specification discloses examples of an information processing apparatus and an information processing system executing the processes in the above (1) to (9). In addition, this specification discloses an example of a game processing method for executing the processes in the above (1) to (9).

According to the storage medium, the information processing system, the information processing apparatus, and the game processing method, many types of items can be caused to appear in the game, and the items can be automatically named.

These and other objects, features, aspects and advantages of the exemplary embodiment will become more apparent from the following detailed description when taken in conjunction with the accompanying drawings.

BRIEF DESCRIPTION OF THE DRAWINGS

FIG. 13 shows an example of a post-composition name that is set for each material item:

FIG. 15 shows an example of correspondence information:

FIG. 25 shows an example of determination of a name of a composite equipment item, regarding a specific equipment item, to a predetermined specific name:

FIG. 26 shows an example of a method for generating an icon image of a composite equipment item:

FIG. 27 shows an example of a list image:

FIG. 28 shows an example of a list image when a composition cancel instruction is performed for a designated composite equipment item in the situation shown in FIG. 27;

FIG. 29 shows an example of various types of data used for information processing in a non-limiting game system:

FIG. 32 is a flowchart showing an example of a flow of list processing executed by the non-limiting game system.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus: which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
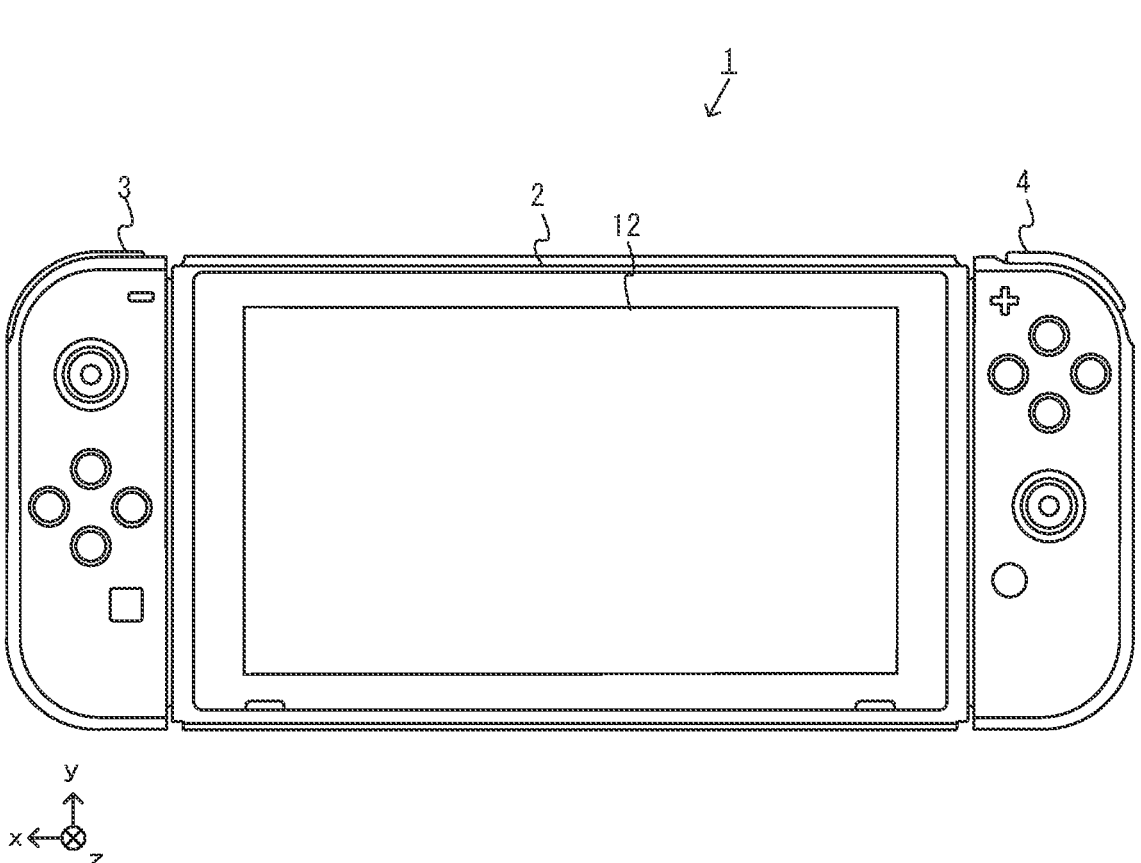
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
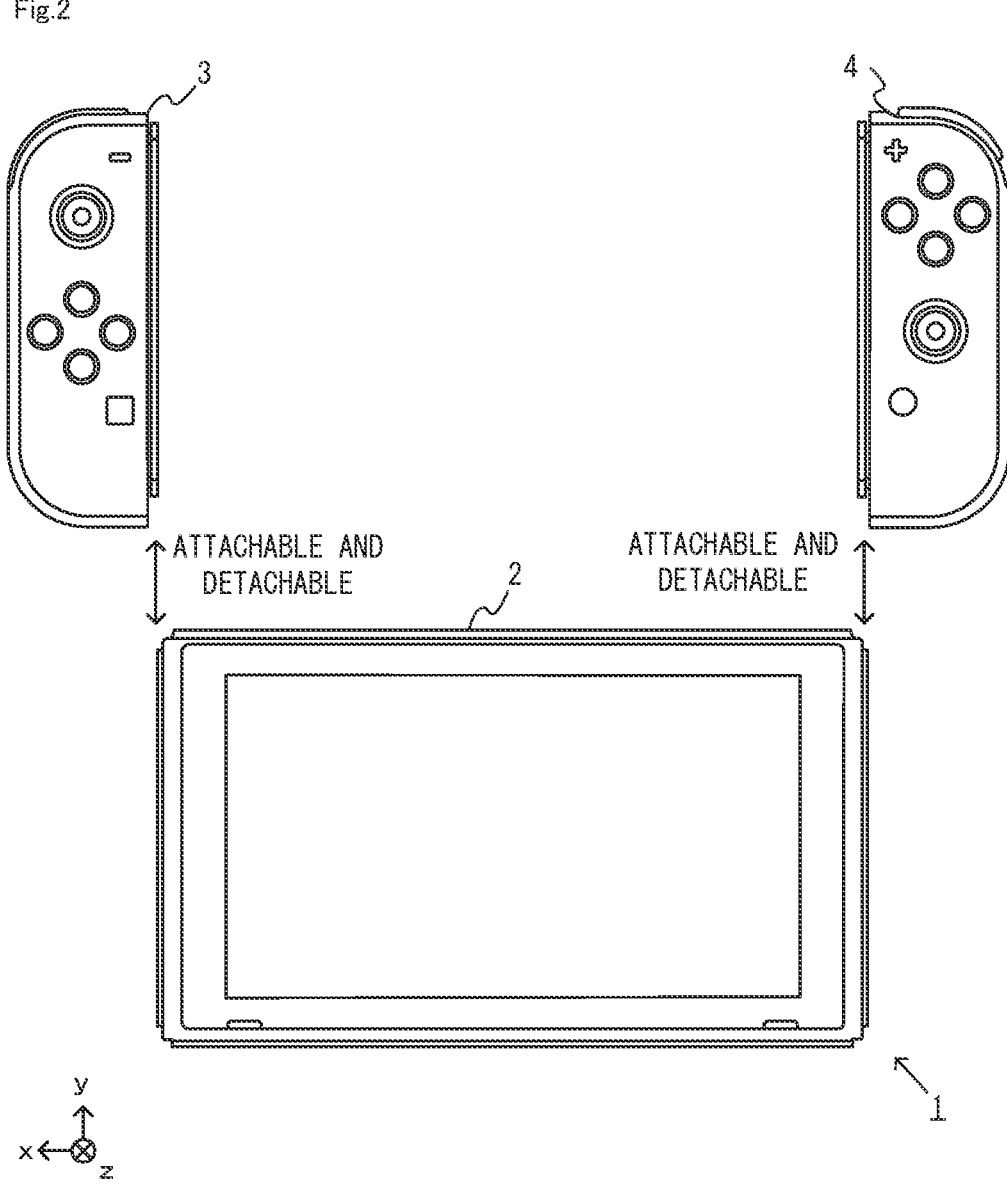
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
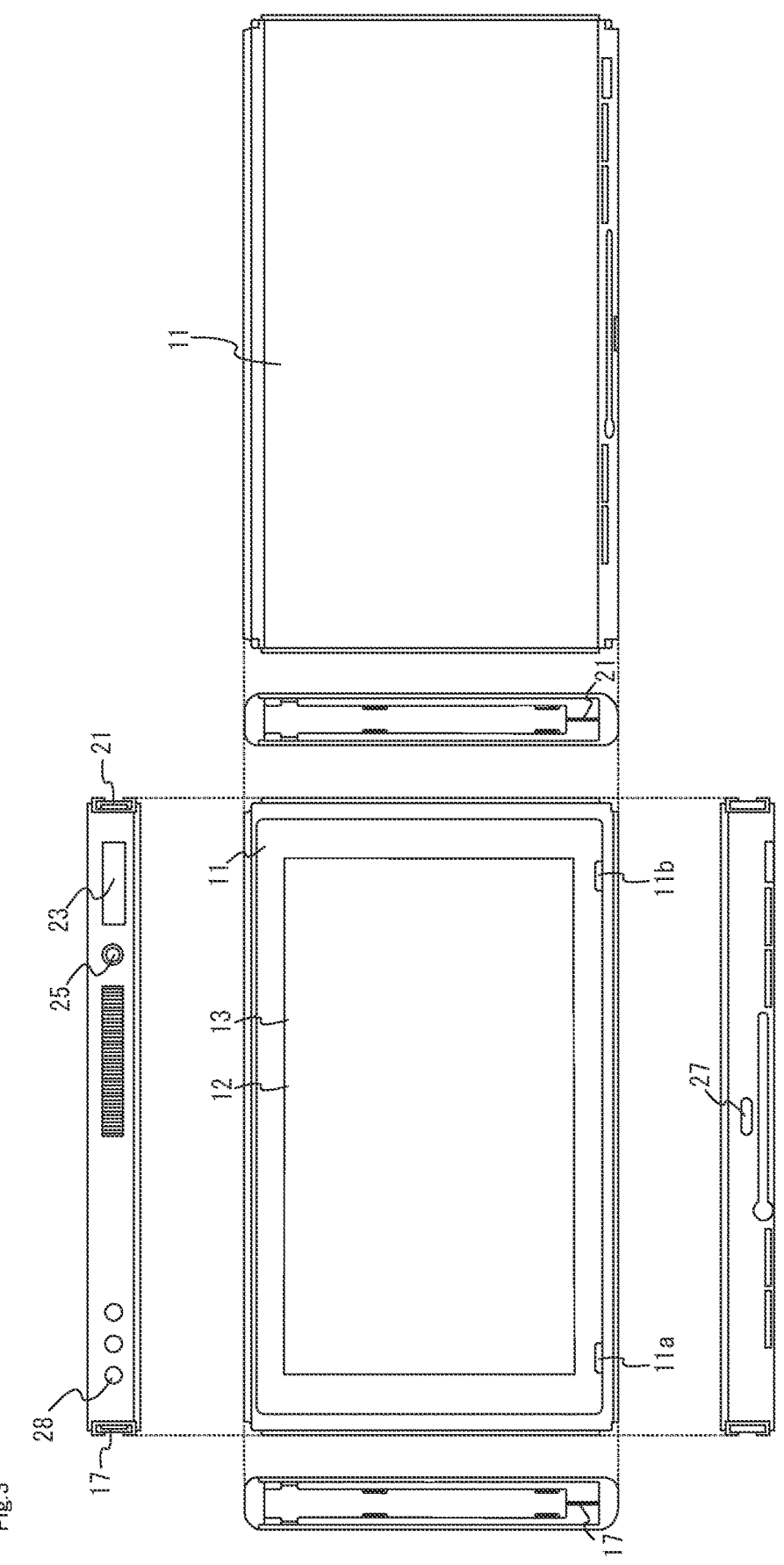
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
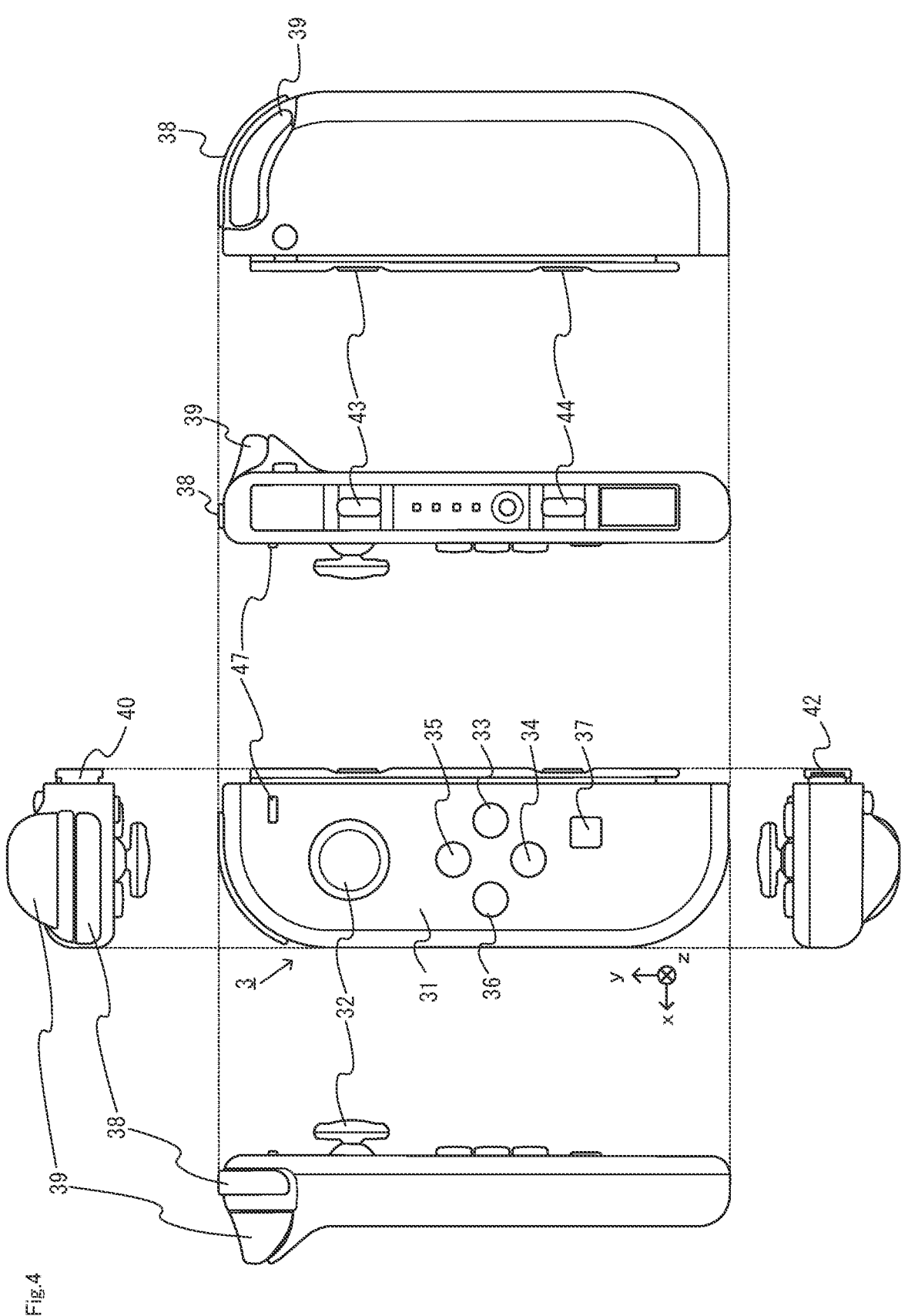
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
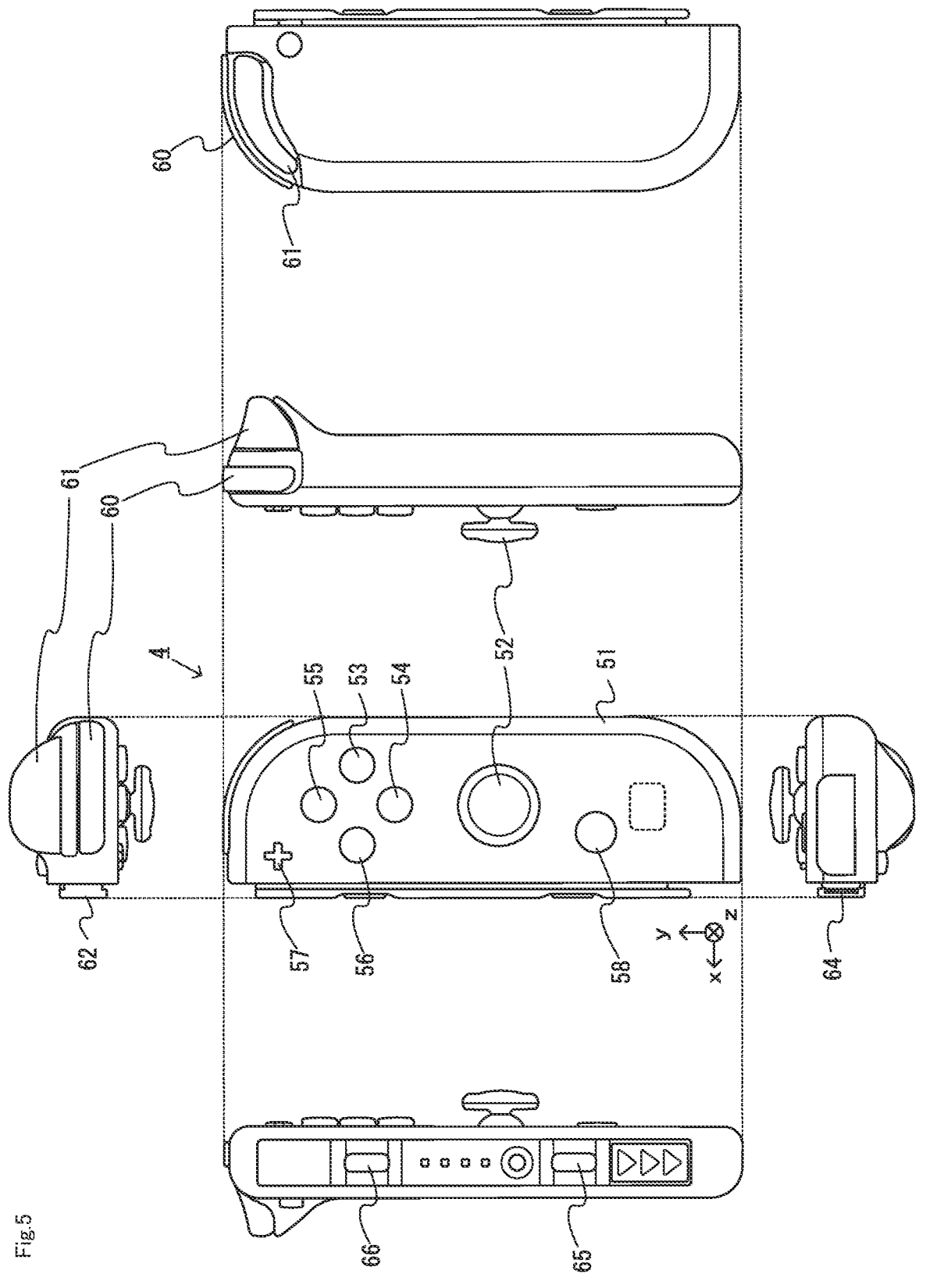
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
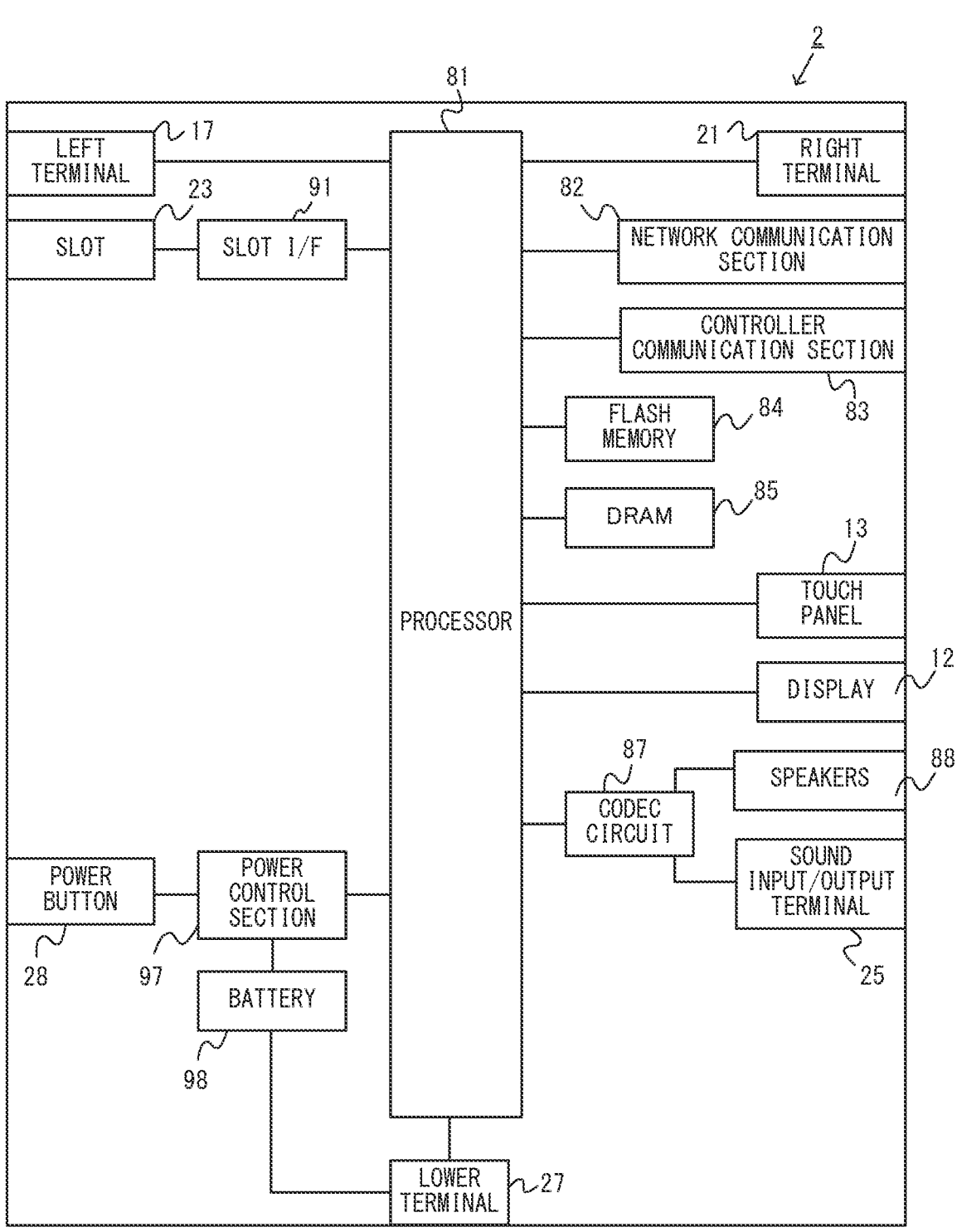
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
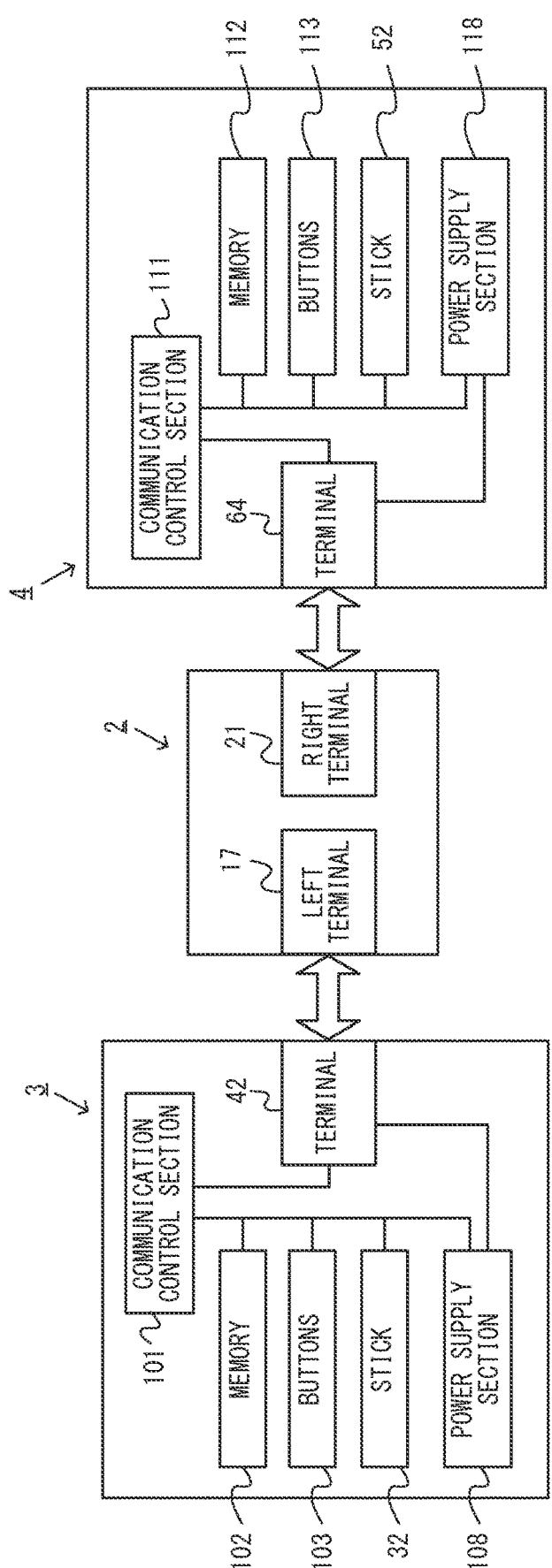
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Processing in Game System]

Hereinafter, an outline of game processing executed in the game system 1 will be described. In the exemplary embodiment, the game system 1 executes game processing for a game in which a player (in other words, a user) operates a player character on a virtual game field. In the exemplary embodiment, the game system 1 composites an equipment item object (hereinafter, referred to as "equipment item") and a material item object (hereinafter, referred to as "material item") to generate a new equipment item (referred to as "composite equipment item").

Among item objects that appear in the game, an equipment item is an item object that the player character can be equipped with, and use. Examples of the equipment item include a sword, a shield, a bow, etc. The equipment items are not limited to the specific examples described above. The state where "the player character is equipped with an equipment item" is a state where the player character can use the equipment item (i.e., can perform an action with the equipment item, such as swinging a sword, holding a shield, or shooting an arrow with a bow). In the exemplary embodiment, the player character can be equipped with an equipment item that is designated by the player from among equipment items possessed by the player character.

Among the item objects that appear in the game, a material item is an item object that can be a material for composition with an equipment item (i.e., can be composited with the equipment item). In the exemplary embodiment, various types of item objects that appear in the game can be material items. For example, item objects, such as a stone object and a log object, that are placed (or lying) on the game field can be material items. In addition, for example, an object, such as a nut object, that the player character can get from an object (e.g., a tree object) placed on the game field can be a material item. Moreover, for example, an object, such as a monster's horn object, that the player character can obtain from a character (e.g., enemy character) appearing in the game field (e.g., by defeating the character) can be a material item. In the exemplary embodiment, the aforementioned equipment items can also be material items. The material items are not limited to the specific examples described above.

A composite equipment item is an item object obtained by compositing an equipment item and a material item. The composite equipment item is an item object that the player character can be equipped with, and use, like an equipment item. In the exemplary embodiment, the word "composite" of the composite equipment item means that the composite equipment item is generated in exchange of the equipment item and material item as original items. That is, when the composite equipment item is generated, the original equipment item and the original material item disappear. Although described later in detail, there is no limitation on the specific process for compositing an equipment item and a material item.

[2-1. Outline of Composition Process]

Figure 8:
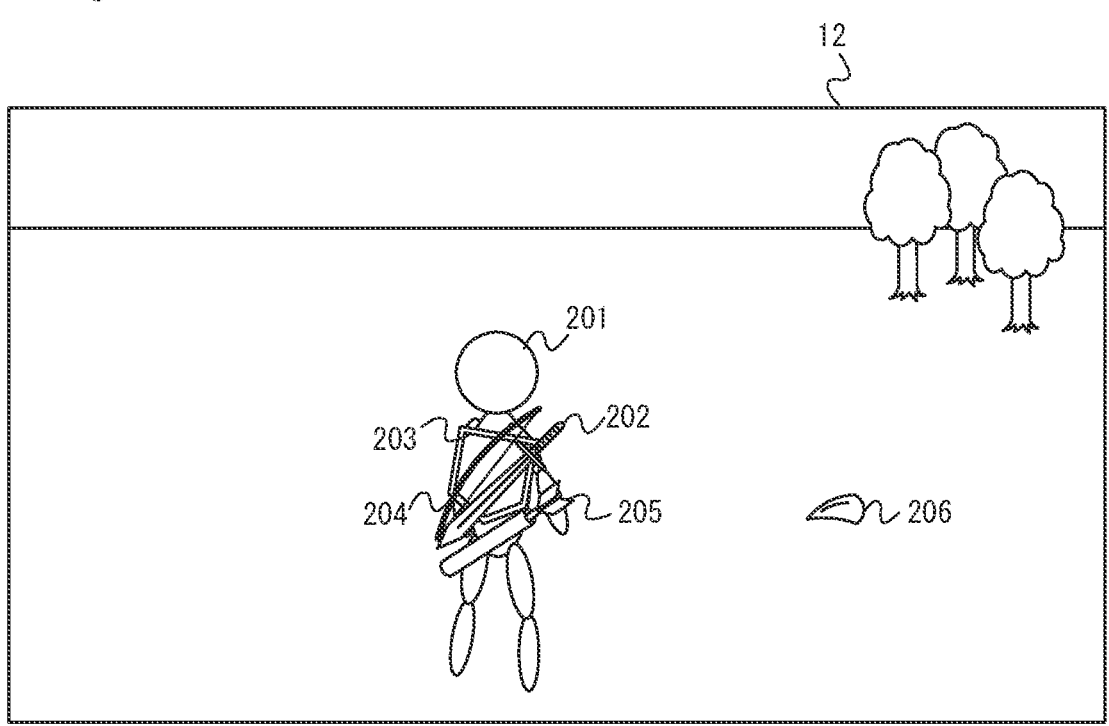
FIG. 8 shows an example of a game image showing a game field in which a player character is placed.

An outline of a composition process for generating a composite equipment item will be described with reference to FIGS. 8 to 10. FIG. 8 shows an example of a game image showing a game field where a player character is placed. The game image is displayed on the display 12 of the main body apparatus 2 in the exemplary embodiment, but may be displayed on another display device connected to the main body apparatus 2.

In the situation shown in FIG. 8, a player character 201 is equipped with a sword object 202, a shield object 203, and bow and arrow objects (specifically, a bow object 204 and an arrow object 205) as equipment items. Thus, in the exemplary embodiment, the player character 201 can be equipped with a plurality of types of equipment items at the same time. Specifically, the player character 201 can be equipped with one short-distance equipment item, one defense equipment item, and one long-distance equipment item. The short-distance equipment item is a weapon-type equipment item, such as the sword object 202, with which the player character 201 can perform a short-distance attack. The defense equipment item is an equipment item, such as the shield object 203, with which the player character 201 can perform defense. The long-distance equipment item is a weapon-type equipment item, such as the bow and arrow objects, with which the player character 201 can perform a long-distance attack. In the exemplary embodiment, in the state where the player character 201 is equipped with the equipment items, the player character 201 wears at least some of the equipment items (see FIG. 8). In other embodiments, the number of equipment items that the player character 201 can be equipped with at the same time is not limited, and may be one.

In the situation shown in FIG. 8, a tusk object 206 as an example of the material item is placed on the game field. The tusk object 206 represents a tusk of an enemy character (not shown), and is placed on the game field when the player character 201 has defeated the enemy character, for example.

In the exemplary embodiment, during the game, the player can perform a composition instruction to composite an equipment item and a material item. For example, the game system 1 receives the composition instruction on the condition that the player character 201 is in the state of being able to exert capability of performing composition (referred to as "composition possible state"). The composition possible state may be, for example, a state where the player character can use a specific item for performing composition, or a state where the player character can use a specific skill for performing composition. In other embodiments, the player may be able to perform a composition instruction while the player character 201 is in any state (i.e., without any condition).

Figure 9:
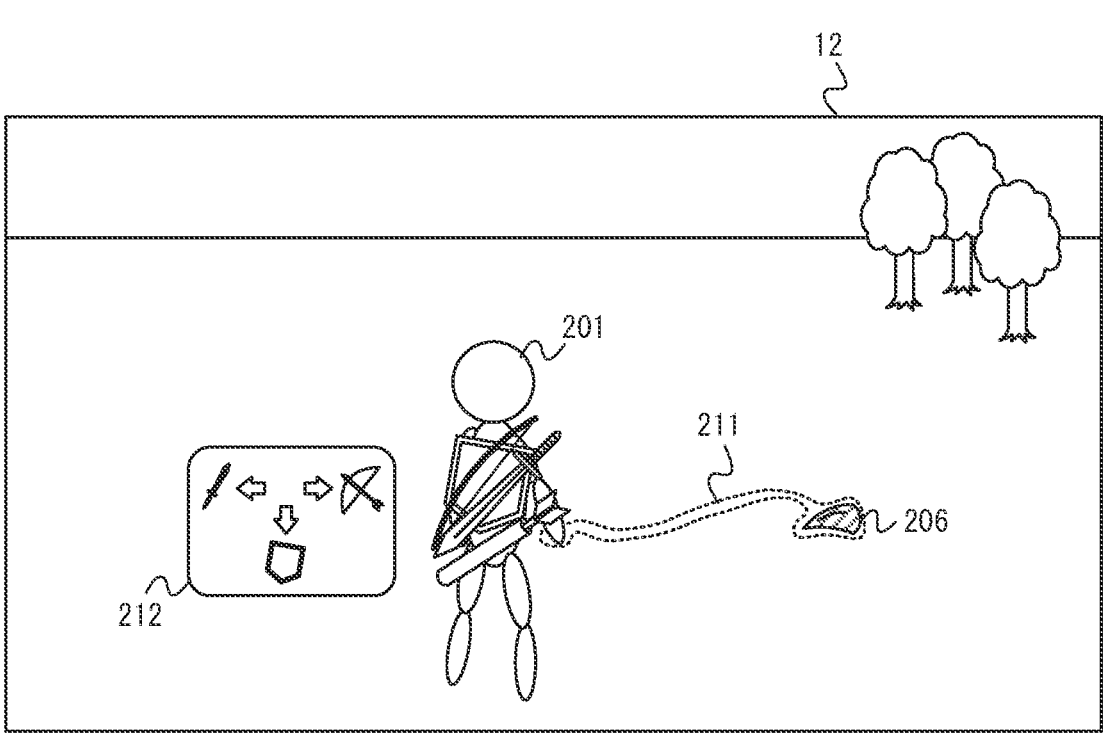
FIG. 9 shows an example of a game image when the player character has entered a composition possible state, from the situation shown in FIG. 8.

FIG. 9 shows an example of a game image when the player character has entered the composition possible state from the situation shown in FIG. 8. In the exemplary embodiment, when the player character 201 enters the composition possible state (i.e., when the composition instruction is allowed), the material item is displayed in an emphasized mode. Specifically, the material item is displayed in a display mode different from that for objects other than the material item. More specifically, the material item is displayed in a color different from that of the other objects, or is displayed with an effect image added thereto. In the example shown in FIG. 9, the tusk object 206 as a material item is displayed in a display mode different from that for the other objects (e.g., tree objects). In FIG. 9, the difference in display mode is represented by hatched lines. Thus, the game system 1 can present, to the user, the object being the material item among the objects on the game field so that the player can easily recognize the object, in the state where the game image showing the game field is displayed.

In the exemplary embodiment, when the player character is in the composition possible state, if a material item that can be composited is present in the game field, the game system 1 displays an effect image 211 indicating the material item to be composited (referred to as "target material item") (see FIG. 9). In the exemplary embodiment, the target material item is determined based on the position and/or the orientation of the player character 201. Specifically, among material items present within a determination range that is set based on the position and the orientation of the player character 201, a material item positioned closest to the player character 201 is determined to be a target material item. Therefore, by moving the player character 201 in the game field, the player can select a target material item from among the material items present in the game field. In other embodiments, there is no limitation on the method for specifying a target material item from among the material items present in the game field.

If a material item to be a target material item does not exist among the material items present in the game field (i.e., if a material item does not exist in the determination range), the effect image 211 is not displayed, and the game system 1 does not receive the composition instruction. That is, in this case, the player character 201 cannot perform composition.

In the exemplary embodiment, the effect image 211 has an integral shape that encloses the tusk object 206 as the target material item and a part (right hand in FIG. 9) of the player character 201, and connects these objects (see FIG. 9). Thus, the effect image associating the target material item with the player character allows the player to more easily recognize the target material item.

In the exemplary embodiment, among the equipment items that the player character 201 is equipped with, an equipment item (referred to as "target equipment item") to be subjected to the composition process is designated by the player. Specifically, the game system 1 display an equipment designation image 212 as an image for the player to designate the target equipment item (see FIG. 9). The equipment designation image 212 is displayed when a composite equipment item can be generated (i.e., when a target material item is placed within the determination range of the player character 201 in the composition possible state). The equipment designation image 212 is an image showing, as options, a plurality of equipment items that the player character is being equipped with. In the exemplary embodiment, the game system 1 performs a process of compositing an equipment item designated by the player from among the options shown in the equipment designation image 212, with the target material item. As described above, by using the equipment designation image 212, the game system 1 can present, to the player, an instruction for designating a target equipment item so that the player can easily recognize the instruction. In other embodiments, the game system 1 may receive the composition instruction without displaying the equipment designation image 212.

In the exemplary embodiment, the equipment designation image 212 shows the correspondence between instructions for designating a target equipment item and the equipment items. Specifically, the equipment designation image 212 includes: an image showing the correspondence between an instruction indicating the left direction and the short-distance equipment item: an image showing the correspondence between an instruction indicating the right direction and the long-distance equipment item; and an image showing the correspondence between an instruction indicating the down direction and the defense equipment item (see FIG. 9). In the state where the equipment designation image 212 is displayed, the player performs one instruction among the instructions in the left direction, right direction, and down direction (e.g., an instruction by pressing one of the left direction button 36, the right direction button 33, and the down direction button 34 of the left controller 3). When one of these instructions has been performed by the player, the game system 1 determines an equipment item corresponding to this instruction as a target equipment item.

In the exemplary embodiment, in response to the instruction designating the target equipment item, the game system 1 composites the equipment item corresponding to the instruction with the target material item. That is, in the exemplary embodiment, the instruction designating the target equipment item also serves as a composition instruction for compositing the equipment item and the target material item. This allows the player to easily perform the operation for the composition process in the case where the player character is equipped with a plurality of equipment items.

There is no limitation on the method for determining a target equipment item. In other embodiments, for example, the game system 1 may determine, as a target equipment item, an equipment item for which the player character 201 takes a motion of holding the same, among the equipment items.

As described above, in the exemplary embodiment, the game system 1 generates the composite equipment item in response to the composition instruction performed by the player. FIG. 10 shows an example of the game image including the player character equipped with the generated composite equipment item. In FIG. 10, as a result of the composition instruction by the player designating the sword object 202 in the state shown in FIG. 9, the player character 201 is equipped with a composite equipment item 213 obtained by compositing the sword object 202 and the tusk object 206.

In the exemplary embodiment, when the composition instruction has been performed, the game system 1 firstly brings the target material item (in FIG. 9, tusk object 206)

on the game field close to the player character 201 (or the target equipment item). In the example shown in FIGS. 9 and 10, the game system 1 performs a display such that the tusk object 206 is attracted toward the player character 201 by the effect image 211. When the target material item comes close to the player character 201, the game system 1 deletes the target material item and changes the target equipment item that the player character 201 is equipped with, to the composite equipment item 213 (see FIG. 10). Thus, in generating the composite equipment item, the original material item from which the composite equipment item is generated can be presented to the player so that the player can easily recognize the material item. There is no limitation on the behaviors of the target material item, the target equipment item, and the player character in generating the composite equipment item.

In the exemplary embodiment, the appearance of the composite equipment item is determined based on the target material item and the target equipment item. For example, the composite equipment item 213 shown in FIG. 10 has an appearance in which the tusk object 206 is integrated with a tip portion of the sword object 202 (or an appearance in which the tip portion of the sword object 202 is replaced with the tusk object 206). Thus, in the exemplary embodiment, the composite equipment item has an appearance including: at least a part of the appearance of the original equipment item being an origin of the composite equipment item; and at least a part of the appearance of the material item being an origin of the composite equipment item. This allows the composite equipment item to give, to the player, an impression that it is an object obtained by combining the equipment item and the material item. Moreover, the appearance of the composite equipment item allows the player to easily recognize the equipment item and the material item that are the origins of the composite equipment item. There is no limitation on the appearance of the composite equipment item. The composite equipment item may have an appearance that does not have a portion overlapping the appearance of the original material item and/or the appearance of the original equipment item.

In the exemplary embodiment, in the composition process, the game system 1 generates the composite equipment item based on the target equipment item and the target material item. That is, the game system 1 generates a three-dimensional model of the composite equipment item by using a three-dimensional model of the target equipment item and a three-dimensional model of the target material item. However, there is no limitation on the specific process for generating a composite equipment item. In other embodiments, for example, the game system 1 may store therein in advance data of a three-dimensional model of a composite equipment item.

In the above-described example, the composition process is executed in the state where the game image, in which the player character 201 is placed on the game field, is displayed. However, there is no limitation on the timing to execute the composition process during the game. For example, during the game, the game system 1 may receive a composition instruction from the player and execute the composition process in response to the composition instruction, in the state where a list image (see FIG. 27) showing a list of items possessed by the player character 201 is displayed. In this case, a target material item and a target equipment item may be selected by the player from the items included in the list image.

As described above, in the exemplary embodiment, a new composite equipment item can be generated by combining an equipment item and a material item. Thus, the number of items appearing in the game can be efficiently increased, whereby many types of items can be caused to appear in the game.

[2-2. Method for Generating Name of Composite Equipment Item]

In the exemplary embodiment, a name is given to a composite equipment item generated as described above. Here, if the game system 1 stores therein in advance the names of all the composite equipment items to be generated, the game system 1 should store therein the names with respect to all the combinations of the equipment items and the material items that can be composited with the equipment items, which may result in an increase in the amount of data stored in the game system 1. The amount of data is likely to be enormous as the number of combinations increases. Therefore, in the exemplary embodiment, when a composite equipment item has been generated, a name to be given to the composite equipment item is newly generated and determined. In this case, the game system 1 need not store therein the data of the names of composite equipment items in advance, thereby reducing the amount of data stored in the game system 1. Hereinafter, a method for generating a name of a composite equipment item will be described.

Hereinafter, an example of generation of a name of a composite equipment item that is obtained by using, as an equipment item, a short-distance equipment item such as a sword or a spear, will be described. Also, in generating a name of a composite equipment item that is obtained by using, as an equipment item, a defense equipment item or a long-distance equipment, the name can be generated by the same method as that for the short-distance equipment item.

Figure 11:
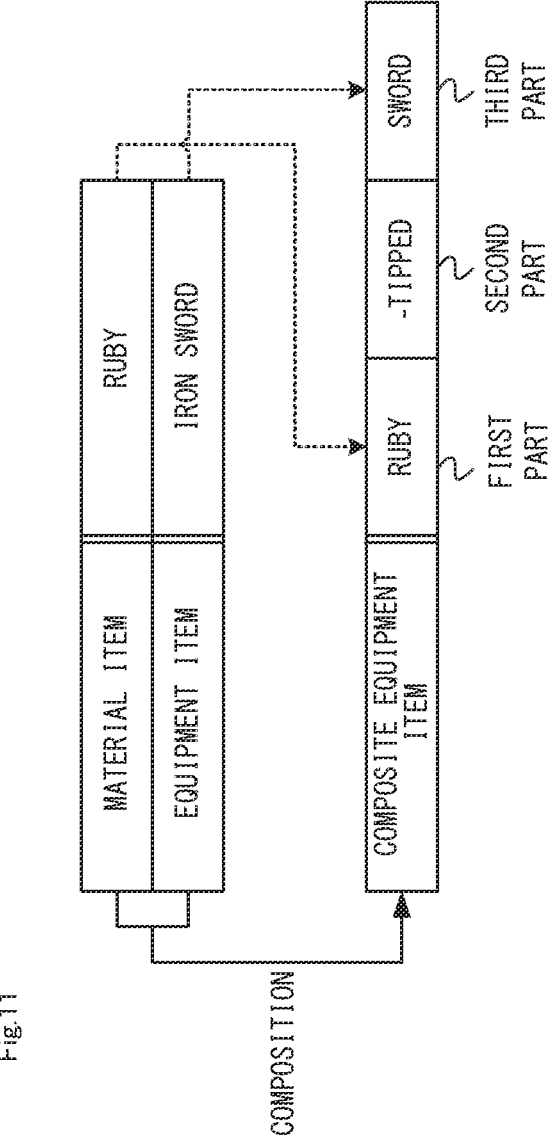
FIG. 11 shows an example of a method for generating a name of a composite equipment item.

FIG. 11 shows an example of a method for generating a name of a composite equipment item. FIG. 11 shows a case of generating a name of a composite equipment item that is obtained by compositing a material item whose name is "ruby" with an equipment item whose name is "iron sword". As shown in FIG. 11, in the exemplary embodiment, the name of the composite equipment item is composed of three parts, i.e., a first part, a second part, and a third part in order from the front.

The first part is a part determined based on the material item. In the example shown in FIG. 11, the first part is "ruby", based on "ruby" that is the name of the material item. Although described later in detail, the first part is not limited to the literal name of the material item, but may be an abbreviated form of the name of the material item or a name based on the property of the material item.

The third part is a part representing the type of the composite equipment item (e.g., sword, spear, etc.). In the example shown in FIG. 11, the type of the composite equipment item is "sword", based on "iron sword" as the equipment item. Therefore, the third part is "sword". Since the third part is the name representing the type such as "sword" or "spear", the third part can be regarded as a part representing the appearance of the composite equipment item. Although described later in detail, the third part is determined based on the original equipment item and/or the original material item. The third part may be a name (e.g., axe or club) representing the type or appearance different from the type or appearance (in FIG. 11, sword) of the equipment item.

The second part is a word connecting the first part and the third part. The second part is a word inserted between the first part and the third part to make the name of the composite equipment item natural. In the example shown in FIG. 11, the second part is "-tipped". The second part may be omitted in some cases (i.e., the name of the composite equipment item may be composed of the first part and the third part following the first part). Although described later in detail, in the exemplary embodiment, the second part is determined based on the equipment item and/or the material item.

As described above, in the example shown in FIG. 11, the name of the composite equipment item is "ruby-tipped sword" obtained by connecting the first to third parts. Thus, in the exemplary embodiment, the game system 1 generates the name of the composite equipment item by determining the first to third parts, based on the combination of the original material item and the original equipment item.

Figure 12:
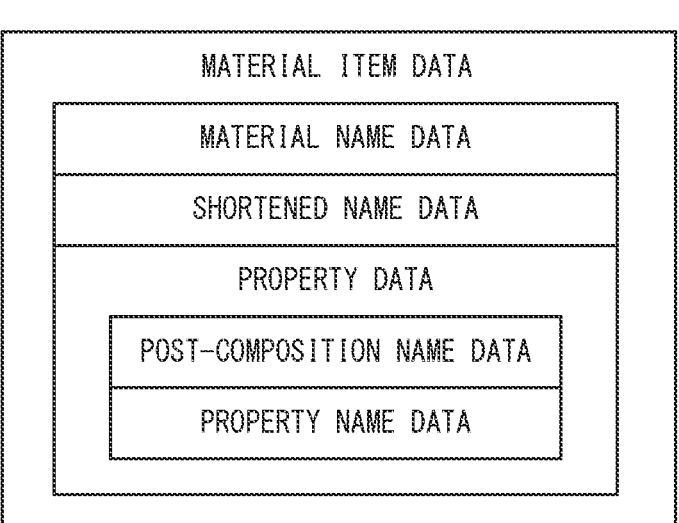
FIG. 12 shows an example of material item data.

Next, data used for generating a name of a composite equipment item will be described with reference to FIGS. 12 to 14. FIG. 12 shows an example of material item data. In the exemplary embodiment, the game system 1 stores therein in advance material item data for each material item. As shown in FIG. 12, the material item data includes material name data and property data.

The material name data indicates the name of the material item. In the exemplary embodiment, the name of the material item can be used as a part (specifically, the first part) of the name of the composite equipment item. The material item data may include shortened name data indicating a shortened name of the material item. Although described later in detail, in the exemplary embodiment, when the material item has a shortened name, the shortened name is used as a part (specifically, the first part) of the name of the composite equipment item, instead of the name of the material item itself. The shortened name may be any name, such as an abbreviation of the name of the material item, which allows the player to recall the material item. Not all the material items have to be given shortened names. A shortened name may be given to a predetermined material item (e.g., a material item having a long name).

The property data indicates the property of the material item. In the exemplary embodiment, the composite equipment item takes over the property of the original material item. That is, the property set for the original material item is set for the composite equipment item. The property of the material item can be regarded as an effect (referred to as "effect at composition") possessed by the composite equipment item generated based on the material item.

There is no limitation on the specific content of the property of the material item. Although described later in detail, in the exemplary embodiment, for example, "range expansion", "magic attack", or the like is set as the property of the material item. The "range expansion" is an effect at composition by which the attack range of the composite equipment item is expanded, compared to that of the equipment item before composition. The "magic attack" is an effect at composition by which a magic attack is enabled.

In the exemplary embodiment, at least one property is set for each material item. That is, material item data regarding each material item includes at least one property data. Some material items may be given two or more properties. In other embodiments, some material items may be given no properties.

In the exemplary embodiment, the property data may occasionally include post-composition name data indicating a post-composition name that is set in association with the property indicated by the property data (see FIG. 12). The post-composition name is a name that can be used as the third part of the composite equipment item based on the material item. For example, the post-composition name may be a name, such as "rod", "sledge", or "hammer" described later, representing the type (or appearance) of the composite equipment item. Although described later in detail, in the exemplary embodiment, if the third part of the composite equipment item is the same as the name (e.g., sword) representing the type of the equipment item before composition, the name of the composite equipment item sometimes becomes unnatural, depending on the material item to be used at composition. In such a case, the post-composition name is used to make the name of the third part of the composite equipment item different from the name representing the type of the equipment item before composition.

FIG. 13 shows an example of post-composition names that are set for the respective material items. In the example shown in FIG. 13, as the types of original equipment items, three types, i.e., "one-handed sword", "two-handed sword", and "spear", are set.

In the example shown in FIG. 13, for a material item "ruby", "magic attack" is set as the property, and "rod" is set as the post-composition name. For a material item "dragon's tail", "range expansion" is set as the property, and "whip" is set as the post-composition name. For a material item "bundle of firewood", "lighting" representing an effect at composition of lighting up the surroundings is set as the property, and "torch" is set as the post-composition name. In the above example, one post-composition name is set for one material item, and the same post-composition name is set for each type of the original equipment item.

The number of post-composition names set for one material item is not limited to one, and may be two or more. In the example shown in FIG. 13, for a material item "dragon's horn", "hammer" is set as a post-composition name to be used when the type of the original equipment item is "one-handed sword" or "two-handed sword", and "sledge" is used as a post-composition name to be used when the type of the original equipment item is "spear". For the material item "dragon's horn", "crush" representing an effect at composition of crushing a specific object is set as the property. Moreover, for a material item "goblin's horn" for which "crush (non-hammer)" is set as the property, "smasher" or "pounder" is set as a post-composition name to be used when the type of the original equipment item is "one-handed sword" or "two-handed sword", and "pulverizer" is set as a post-composition name to be used when the type of the original equipment item is "spear". Here, the property of "crush (non-hammer)" represents an effect at composition of crushing a specific object, and represents that the appearance is unlike a hammer.

As for one material item, different post-composition names may be set for the respective original equipment items. In the example shown in FIG. 13, for a material item "golem's horn", "reaper", "blade", and "spear" are set as post-composition names to be used when the type of the original equipment item is "one-handed sword", "two-handed sword", and "spear", respectively. For the material item "golem's horn", "edged tool" representing an effect at composition of being an edged weapon is set as the property. Likewise, for a material item "pointed stone", "axe", "two-handed axe", and "halberd" are set as post-composition names to be used when the type of the original equipment item is "one-handed sword", "two-handed sword", and "spear", respectively. For the material item "pointed stone", "cutting" representing an effect at composition of cutting down a tree object is set as the property. For a material item "log", "club", "bat", and "spear" are set as post-composition names when the type of the original equipment item is "one-handed sword", "two-handed sword", and "spear", respectively. Here, as for the material item "log", "blunt instrument" representing an effect at composition of being a blunt weapon is set as the property.

As described above, a post-composition name is set in advance (e.g., before starting the game) for each combination of an effect at composition that is associated with a material item and a type that is associated with an equipment item.

In the exemplary embodiment, the material item data may occasionally include property name data (see FIG. 12). The property name data indicates the name representing the property of the material item. For example, as for a material item for which a property of "explosion" is set as an effect at composition, property name data indicating the name "blasting" representing this property is set. Although described later in detail, in the exemplary embodiment, as the first part of the name of a composite equipment item, a property name set for a material item may be used instead of the name of the material item.

Whether or not the property data of the material item data includes the post-composition name data and/or the property name data is set for each material item. Depending on the material item, the property data may include only the post-composition name data, may include only the property name data, may include both the post-composition name data and the property name data, or may include neither the post-composition name data nor the property name data.

In the exemplary embodiment, the same post-composition name data and/or the same property name data are/is set for the property data indicating the same property. However, in other embodiments, even if material item data includes property data indicating the same property, different post-composition name data and/or different property name data may be set depending on the material item.

Figure 14:
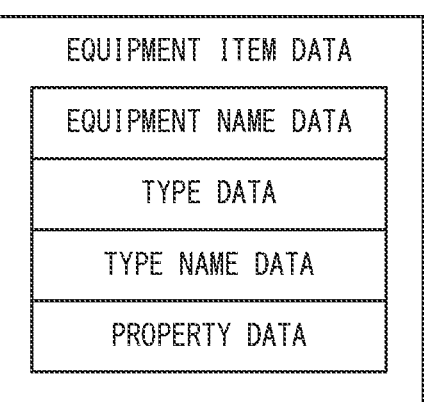
FIG. 14 shows an example of equipment item data.

FIG. 14 shows an example of equipment item data. In the exemplary embodiment, the game system 1 stores therein in advance equipment item data for each equipment item. As shown in FIG. 14, the equipment item data includes equipment name data, type data, type name data, and property data.

The equipment name data indicates the name of the equipment item. In the exemplary embodiment, the name of the equipment item can be used as a part (specifically, the first part) of the name of a composite equipment item for which the equipment item is used as a material item.

The type data indicates the type of the equipment item (e.g., one-handed sword or spear). In addition, the type name data indicates the name (referred to as "type name") representing the type of the equipment item. For example, when the equipment item is "iron sword", the type of the equipment item is set to "one-handed sword", and the type name data indicates the type name "sword". The type name can be regarded as a shortened name of the equipment item. Depending on the equipment item, the same name as the name of the equipment item may be set as the type name. In the exemplary embodiment, the type name is used as a part (specifically, the third part) of the name of a composite equipment item based on the equipment item.

The property data indicates the property of the equipment item. The property of the equipment item can be regarded as performance of the equipment item. In the exemplary embodiment, the composite equipment item takes over the property of the original equipment item (in addition to taking over the property of the original material item). That is, the property set for the original equipment item is set for the composite equipment item. The property of the equipment item can be regarded as an effect (or function) possessed by the equipment item. In addition, the property of the equipment item can be regarded as an effect (i.e., effect at composition) possessed by the composite equipment item generated based on the equipment item.

There is no limitation on the specific content of the property of the equipment item. Although described later in detail, in the exemplary embodiment, for example, "blunt instrument", "edged tool", or the like is set as the property of the equipment item. The "blunt instrument" represents that the equipment item is a blunt weapon, and the "edged tool" represents that the equipment item is an edged weapon.

Although not shown in the figures, like the material item data, the equipment item data may include post-composition name data and/or property name data, depending on the equipment item.

In the exemplary embodiment, the game system 1 generates the name of the composite equipment item, based on the pieces of data included in the material item data and the pieces of data included in the equipment item data. In the exemplary embodiment, according to patterns of the material item (specifically, the property of the material item) and the equipment item (specifically, the type or property of the equipment item), rules for generating the name of the composite equipment item (referred to as "naming rules") are determined in advance (see FIG. 15). Specifically, the game system 1 stores therein in advance correspondence information (e.g., table) indicating the correspondence between conditions regarding the patterns and the naming rules, and specifies a naming rule to be used for generating the name of the composite equipment item, based on the material item and the equipment item, by referring to the correspondence information.

FIG. 15 shows an example of the correspondence information. As shown in FIG. 15, the correspondence information includes the patterns (or conditions regarding the patterns; hereinafter referred to as "pattern conditions") of material items and/or equipment items, and naming rules corresponding to the respective patterns. In the exemplary embodiment, when a pattern regarding an original material item and an original equipment item matches a pattern condition included in the correspondence information, the game system 1 generates the name of the composite equipment item according to a naming rule corresponding to the matched pattern condition.

For example, when the property of the original material item is "range expansion", the pattern regarding the original material item and the original equipment item matches the pattern condition whose priority is 3 in FIG. 15. Therefore, the naming rule corresponding to this pattern condition (i.e., the rule of setting the name of the composite equipment item to ["material name (i.e., the name of material item)" "post-composition name"]) is used. Thus, in the exemplary embodiment, the naming rule is specified based on the pattern of the material item and the equipment item, and the name of the composite equipment item is generated according to the specified naming rule.

As described above, in the exemplary embodiment, the property of the original material item and the type and property of the original equipment item are set for the composite equipment item. Therefore, the game system 1 may determine, among the pattern conditions included in the correspondence information, a pattern condition to which the pattern of the material item and the equipment item matches, with reference to the type and property set for the composite equipment item (instead of referring to the properties of the material item and the equipment item).

Next, with reference to FIGS. 16 to 24, a specific example of generation of a name of a composite equipment item based on a pattern condition and a naming rule included in the correspondence information, will be described. Hereinafter, among the combinations of the pattern conditions and the naming rules included in the correspondence information shown in FIG. 15, typical combinations will be described with reference to the drawings. In the exemplary embodiment, a priority order is set for the pattern conditions as shown in FIG. 15, but specific examples of naming rules will be described in an order different from the priority order, in order to make the description easily understandable. The priority order will be described later.

Figure 16:
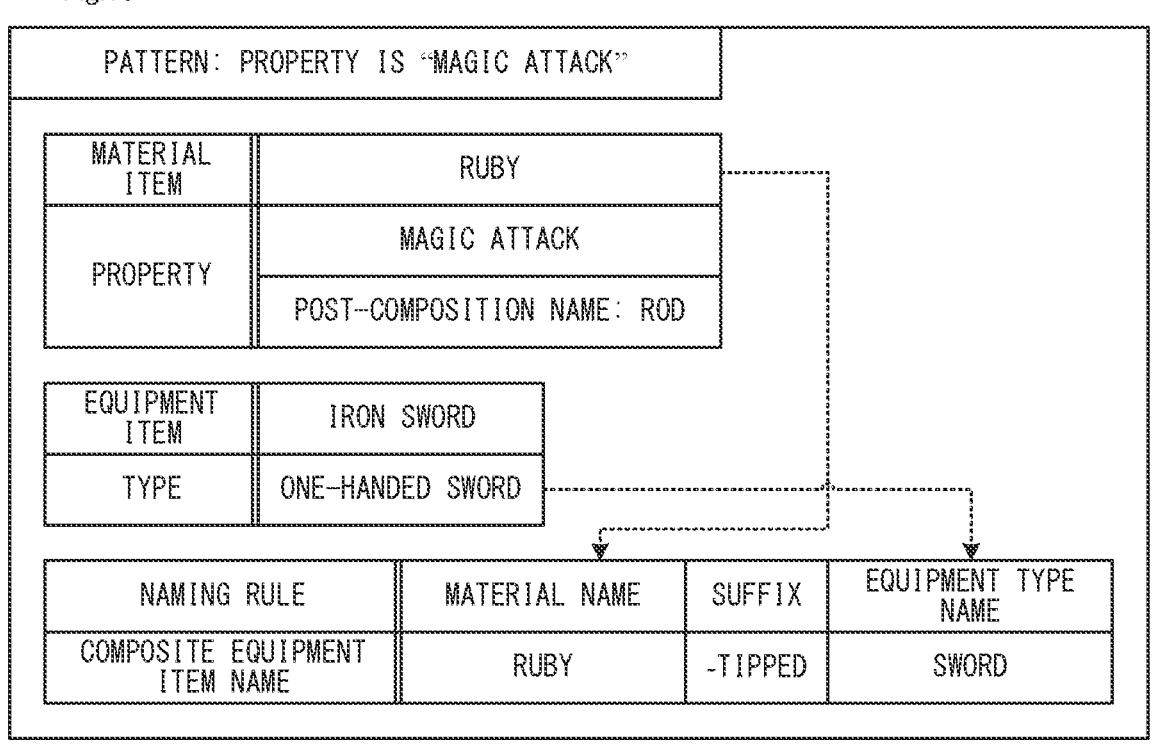
FIG. 16 shows an example of generation of a name of a composite equipment item that is generated by compositing a material item "ruby" and an equipment item "iron sword"

Specific Example 1: Naming Rule Using Name of Material Item and Type Name of Equipment Item FIG. 16 shows an example of generation of a name of a composite equipment item that is generated by compositing the material item "ruby" and the equipment item "iron sword" shown in FIG. 11. In the example shown in FIG. 16, for the material item "ruby", "magic attack" is set as the property, and "rod" is set as the post-composition name. In addition, in the example shown in FIG. 16, the type of the equipment item "iron sword" is "one-handed sword", and "sword" is set as the type name.

In FIGS. 16 to 24, among the pieces of information set for the material items and the equipment items, information that is not directly used for generating the name of the composite equipment item may occasionally be omitted (e.g., in FIG. 16, performance set for the equipment item is omitted).

The composite equipment item generated by compositing the material item "ruby" and the equipment item "iron sword" shown in FIG. 16 has, for example, an appearance in which ruby as a precious stone is set at the tip of the sword, and becomes capable of exerting the effect of "magic attack". That is, when the player character has performed an attack action with the composite equipment item, the game system 1 executes a process of causing a magic attack (e.g., an attack of shooting a magic bullet).

The pattern of the material item and the equipment item shown in FIG. 16 matches the pattern condition that the property of "magic attack" should be included (pattern condition whose priority is 5 in the correspondence information shown in FIG. 15). Therefore, in the example shown in FIG. 16, the naming rule corresponding to this pattern condition is applied to generate the name of the composite equipment item.

In the example shown in FIG. 16, the applied naming rule is to use the name of the material item as the first part, use "-tipped" that is a suffix as the second part, and use the type name of the equipment item as the third part. As described above, in the example shown in FIG. 16, since the name of the material item is "ruby" and the type name of the equipment item is "sword", the name of the composite equipment item generated according to the above naming rule is "ruby-tipped sword".

In the example shown in FIG. 16, the game system 1 generates, as the name of the composite equipment item, the name including: the name that is associated with the material item and represents the material item (i.e., the name or shortened name of the material item); and the name that is associated with the equipment item and represents the type of the equipment item (i.e., the type name of the equipment item). The name thus generated allows the player to easily recall the original items, and easily understand the name as the name of the composite equipment item.

Figure 17:
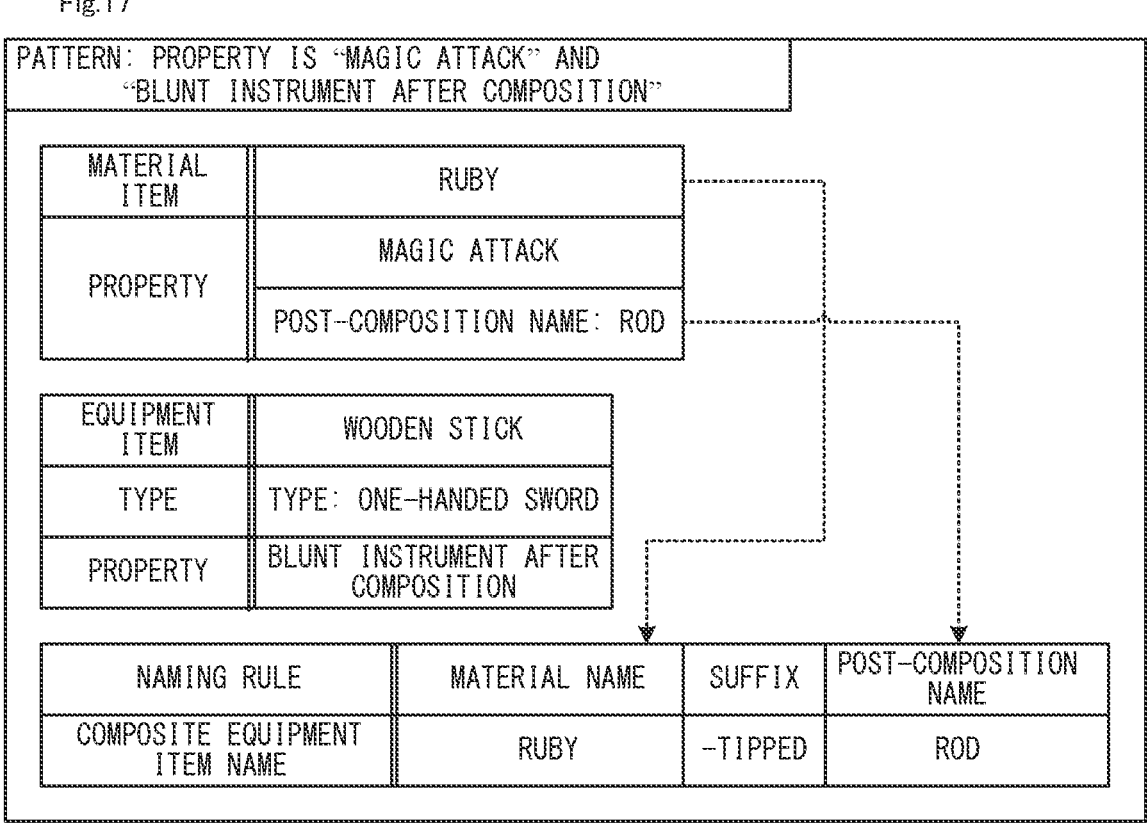
FIG. 17 shows an example of generation of a name of a composite equipment item that is generated by compositing a material item "ruby" and an equipment item "wooden stick"

Specific Example 2: Naming Rule 1 Using Name of Material Item and Type Name of Equipment Item FIG. 17 shows an example of generation of a name of a composite equipment item that is generated by compositing the material item "ruby" and the equipment item "wooden stick". In the example shown in FIG. 17, the material item "ruby" is the same as that shown in FIG. 16. In the example shown in FIG. 17, "one-handed sword" is set as the type of the equipment item "wooden stick", and "blunt instrument after composition" representing that the equipment item becomes a blunt instrument after composition, is set as the property of the equipment item.

The composite equipment item generated by compositing the material item "ruby" and the equipment item "wooden stick" shown in FIG. 17 has an appearance in which ruby as a precious stone is set at the tip of the wooden stick, and becomes capable of exerting the effect of "magic attack".

The pattern of the material item and the equipment item shown in FIG. 17 matches the pattern condition that the property of "magic attack" and the property of "blunt instrument after composition" should be included (pattern condition whose priority is 4 in the correspondence information shown in FIG. 15). Therefore, in the example shown in FIG. 17, the naming rule corresponding to this pattern condition is applied to generate the name of the composite equipment item.

In the example shown in FIG. 17, the applied naming rule is to use the name of the material item as the first part, use "-tipped" that is a suffix as the second part, and use the post-composition name (set for the material item) as the third part. As described above, in the example shown in FIG. 17, since the name of the material item is "ruby" and the post-composition name is "rod", the name of the composite equipment item generated according to the above naming rule is "ruby-tipped rod".

In the exemplary embodiment, an example as follows is used for generating a name of a composite equipment item by using the name of a material item and a post-composition name, like the example shown in FIG. 17.

That is, in the exemplary embodiment, the correspondence information shown in FIG. 15 includes: a pattern condition that the property of "lighting" capable of lighting up the surroundings should be included; and a naming rule to use the name of the material item as the first part, omit the second part, and use the post-composition name as the third part, as a combination of a pattern condition and a naming rule whose priority is 12. For example, when the material item "bundle of firewood" whose shortened name is "firewood" and whose post-composition name is "torch" (see FIG. 13) is composited with the equipment item "wooden stick", the combination of the material item and the equipment item matches the above pattern condition. As a result, the name of the composite equipment item becomes "firewood torch".

As described above, in the example shown in FIGS. 16 and 17, a first pattern (specifically, the pattern shown in FIG. 16) and a second pattern (specifically, the pattern shown in FIG. 17), among the plurality of patterns prepared in the game system 1, have the same information of the effect at composition (specifically, the property of "magic attack" is set for both the patterns) and have different information associated with the equipment item (specifically, the property of "blunt instrument after composition" is set for only the second pattern). The naming rules corresponding to the first pattern and the second pattern have the same rule for determining the first part (i.e., the name of the material item is used for both the patterns) and have different rules for determining the third part (i.e., the type name of the equipment item is used for the first pattern while the post-composition name set for the material item is used for the second pattern).

As described above, in the exemplary embodiment, different naming rules are used according to the equipment item (specifically, the type or property of the equipment item) even if the same material item is used, whereby the name of the composite equipment item can be generated according to the different naming rules. In the exemplary embodiment, although the composite equipment item has an appearance different from that of the original equipment item, the name suitable for the appearance of the composite equipment item can be easily generated by using the different naming rules according to the equipment items even if the same material item is used.

Figure 18:
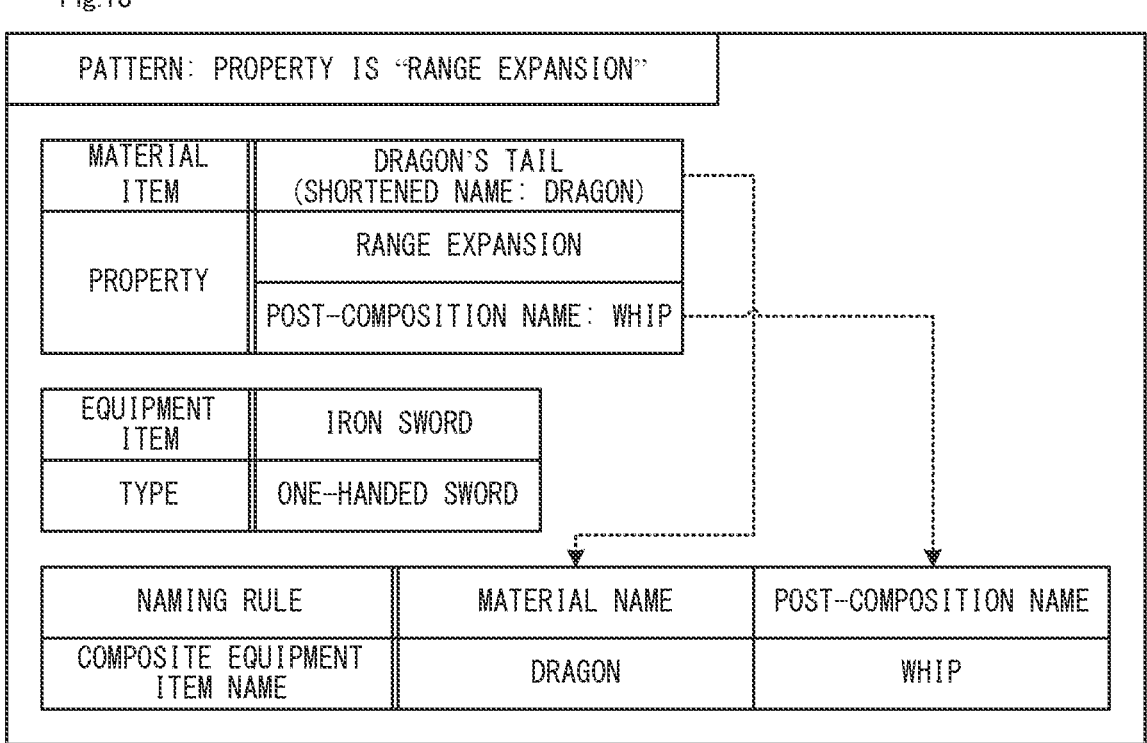
FIG. 18 shows an example of generation of a name of a composite equipment item that is generated by compositing a material item "dragon's tail" and an equipment item "iron sword"

Specific Example 3: Naming Rule 2 Using Name of Material Item and Type Name of Equipment Item FIG. 18 shows an example of generation of a name of a composite equipment item that is generated by compositing the material item "dragon's tail" and the equipment item "iron sword". In the example shown in FIG. 18, "dragon" is set as a shortened name of the material item "dragon's tail". In addition, "range expansion" representing the effect of expanding the attack range is set as the property of the material item, and "whip" is set as the post-composition name of the material item. In the example shown in FIG. 18, the equipment item "iron sword" is the same as that shown in FIG. 16.

The composite equipment item generated by compositing the material item "dragon's tail" and the equipment item "iron sword" shown in FIG. 18 has, for example, an appearance, like a whip, in which the tail is attached to the tip of the sword, and has the effect of "range expansion". That is, the game system 1 executes a process of expanding the attack range of the attack action by the composite equipment item, compared to that of the equipment item before composition.

The pattern of the material item and the equipment item shown in FIG. 18 matches the pattern condition that the property of "range expansion" should be included (pattern condition whose priority is 3 in the correspondence information shown in FIG. 15). Therefore, in the example shown in FIG. 18, the naming rule corresponding to this pattern condition is applied to generate the name of the composite equipment item.

In the example shown in FIG. 18, the applied naming rule is to use the name of the material item as the first part, omit the second part, and use the post-composition name (set for the material item) as the third part. As described above, in the example shown in FIG. 18, "dragon" is set as the shortened name of the material item, and the post-composition name is "whip". Therefore, the name of the composite equipment item generated according to the above naming rule is "dragon whip". Thus, in the exemplary embodiment, in the case where the naming rule is to use the name of the material as the first part, if the shortened name is set for the material item, the game system 1 uses the shortened name as the first part. This reduces the possibility that the name of the composite equipment item becomes too long.

According to the example shown in FIGS. 17 and 18, the game system 1 generates, as the name of the composite equipment item, the name including: the name being associated with the material item and representing the material item (i.e., the name or shortened name of the material item); and the name according to the material item and representing the type and/or the appearance of the composite equipment item (i.e., the post-composition name). In the exemplary embodiment, since the appearance of the composite equipment item is different from that of the original equipment item (see FIG. 10), there is a possibility that the appearance of the composite equipment item does not follow the type (e.g., one-handed sword, spear, etc.) represented by the name of the original equipment item. For example, the appearance of the composite equipment item in the example shown in FIG. 18 is like a whip obtained by attaching the dragon's tail to the tip of the sword. Therefore, if the name of the composite equipment item is "○○-tipped sword" using the type name of the original equipment item, the name of the composite equipment item does not match the appearance. Meanwhile, according to the exemplary embodiment, the naming rule shown in FIG. 17 or 18 allows the name of the composite equipment item to be a more appropriate name that follows the appearance of the composite equipment item.

Figure 19:
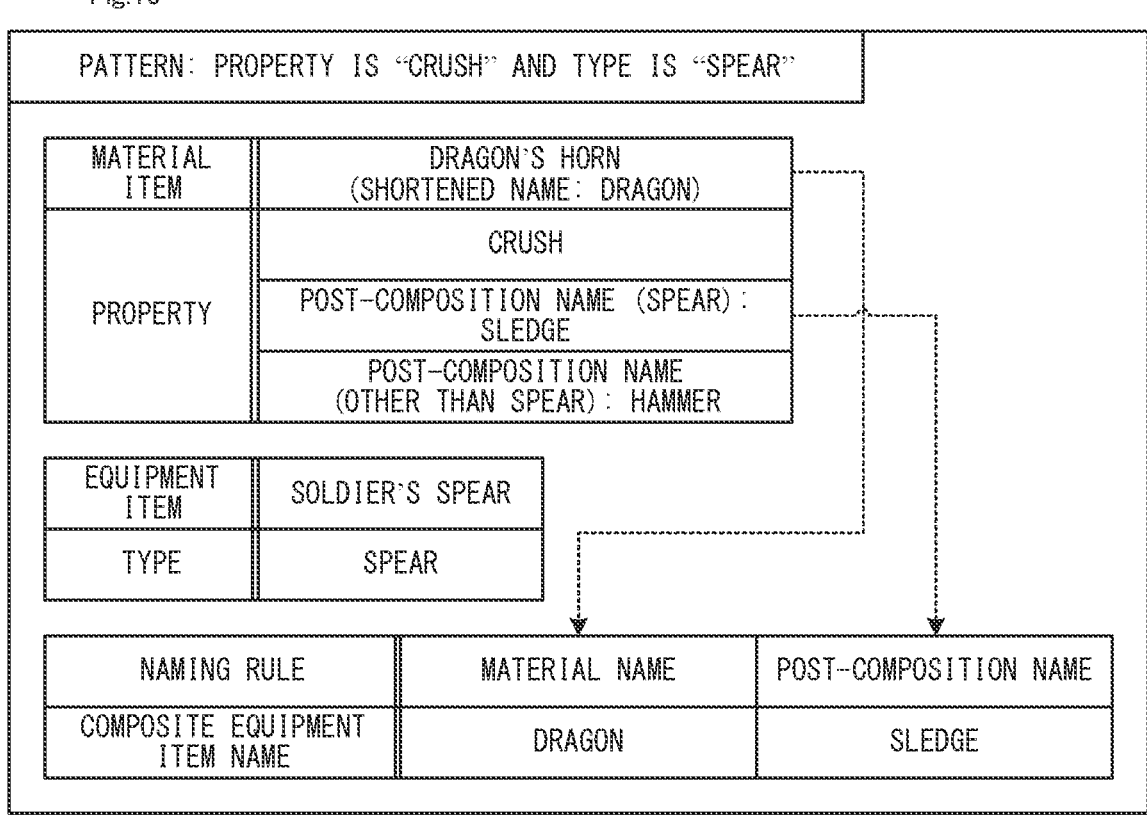
FIG. 19 shows an example of generation of a name of a composite equipment item that is generated by compositing a material item "dragon's horn" and an equipment item "soldier's spear"

Specific Example 4: Naming Rule 1 when a Plurality of Types of Post-Composition Names are Set FIG. 19 shows an example of generation of a name of a composite equipment item that is generated by compositing the material item "dragon's horn" and an equipment item "soldier's spear". In the example shown in FIG. 19, "dragon" is set as a shortened name of the material item "dragon's horn". In addition, "crush" representing the effect of crushing a specific object with a composite equipment item based on the material item is set as the property of the material item. Furthermore, two types of names are set as post-composition names for the material item. Specifically, for the material item, "sledge" is set as a post-composition name to be used when the type of the equipment item is "spear", and "hammer" is set as a post-composition name to be used when the type of the equipment item is other than "spear" (see FIG. 13). Moreover, in the example shown in FIG. 19, "spear" is set as the type of the equipment item "soldier's spear".

The composite equipment item generated by compositing the material item "dragon's horn" and the equipment item "soldier's spear" shown in FIG. 19 has, for example, an appearance in which the horn is attached to the tip of the spear, and has the effect of "crush". That is, the game system 1 executes a process of causing a predetermined object to be crushed (or disappear) when an attack action with the composite equipment item hits the predetermined object. The predetermined object is, for example, a rock that cannot be crushed by an attack action with an equipment item not having the effect of crush.

The pattern of the material item and the equipment item in the example shown in FIG. 19 matches the pattern condition that the property of "crush" should be included and the type of the equipment item should be "spear" (pattern condition whose priority is 6 in the correspondence information shown in FIG. 15). Therefore, in the example shown in FIG. 19, the naming rule corresponding to this pattern condition is applied to generate the name of the composite equipment item.

In the example shown in FIG. 19, the applied naming rule is to use the name of the material item as the first part, omit the second part, and use the post-composition name as the third part. As described above, in the example shown in FIG. 19, "dragon" is set as the shortened name of the material item, and the post-composition name to be used when the type of the equipment item is "spear" is "sledge". Therefore, the name of the composite equipment item generated according to the above naming rule is "dragon sledge".

Figure 20:
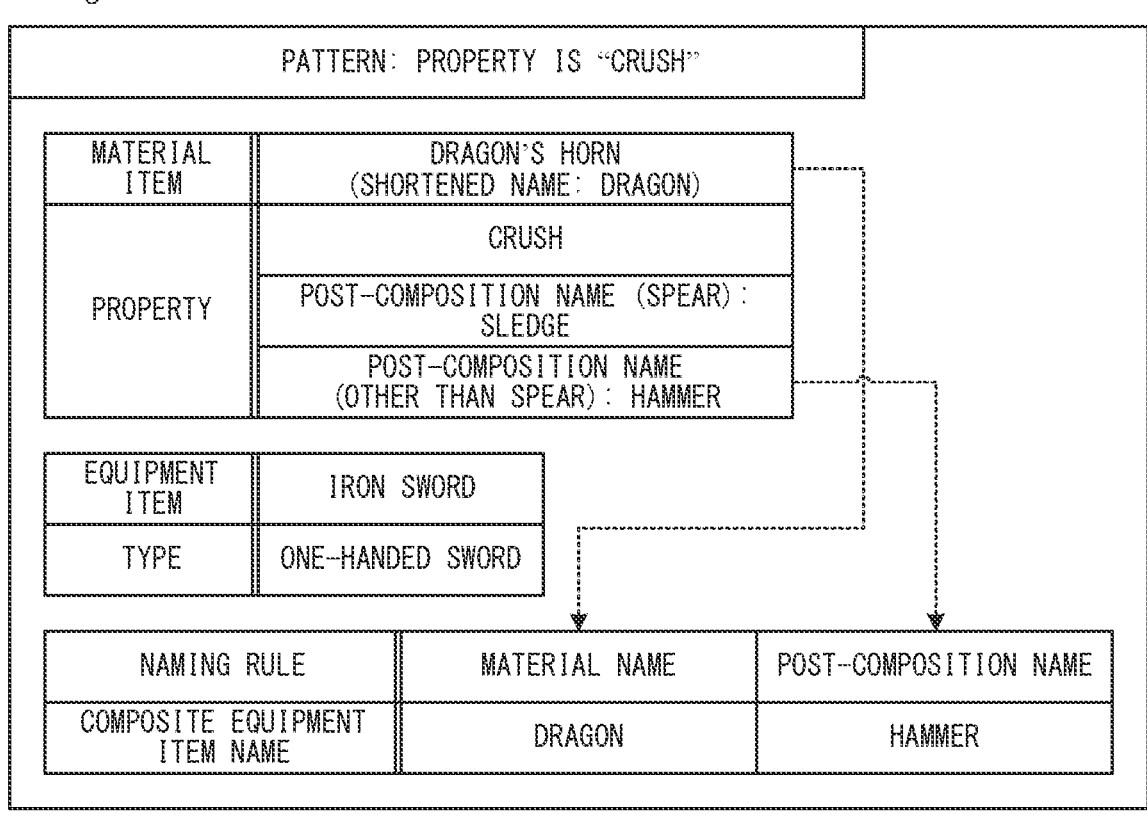
FIG. 20 shows an example of generation of a name of a composite equipment item that is generated by compositing a material item "dragon's horn" and an equipment item "iron sword"

Specific Example 5: Naming Rule 2 when a Plurality of Types of Post-Composition Names are Set FIG. 20 shows an example of generation of a name of a composite equipment item that is generated by compositing the material item "dragon's horn" and the equipment item "iron sword". In the example shown in FIG. 20, the material item "dragon's horn" is the same as that shown in FIG. 19, and the equipment item "iron sword" is the same as that shown in FIG. 16.

The composite equipment item generated by compositing the material item "dragon's horn" and the equipment item "iron sword" shown in FIG. 20 has, for example, an appearance, like a hammer, in which the horn is attached to the tip of the sword, and has the effect of "crush" as described above.

The pattern of the material item and the equipment item shown in the example of FIG. 20 matches the pattern condition that the property of "crush" should be included (pattern condition whose priority is 8 in the correspondence information shown in FIG. 15). Therefore, in the example shown in FIG. 20, the naming rule corresponding to this pattern condition is applied to generate the name of the composite equipment item.

In the example shown in FIG. 20, the applied naming rule is to use the name of the material item as the first part, omit the second part, and use the post-composition name as the third part. As described above, in the example shown in FIG. 20, "dragon" is set as the shortened name of the material item, and the post-composition name to be used when the type of the equipment item is other than "spear" is "hammer". Therefore, the name of the composite equipment item generated according to the above naming rule is "dragon hammer".

According to the examples shown in FIGS. 19 and 20, as in the examples shown in FIGS. 17 and 18, the game system 1 can generate the name including: the name representing the material item (i.e., the name or shortened name of the material item); and the name according to the material item and representing the type and/or the appearance of the composite equipment item (i.e., the post-composition name). Furthermore, in the examples shown in FIGS. 19 and 20, the game system 1 can make the name of the composite equipment item different according to the type of the equipment item by setting in advance a plurality of post-composition names according to the types of the equipment items.

In the exemplary embodiment, an example as follows is used for generating a name of a composite equipment item by using the name of a material item and one of a plurality of types of post-composition names set for the material item, like the examples shown in FIGS. 19 and 20.

The correspondence information shown in FIG. 15 includes: a pattern condition that the property of "cutting" capable of cutting down a tree object should be included; and a naming rule to use the name of the material item as the first part, omit the second part, and use the post-composition name as the third part, as a combination of a pattern condition and a naming rule whose priority is 13. In addition, as for the material item "pointed stone" for which the property of "cutting" is set, a shortened name "stone" is set, and three types of post-composition names, "axe", "two-handed axe", and "halberd", are respectively set for the types of the equipment item (i.e., one-handed sword, two-handed sword, and spear) (see FIG. 13). Here, when the above material item and the equipment item "wooden stick" are composited, the combination of the material item and the equipment item matches the above pattern condition. As a result, the name of the composite equipment item becomes "stone axe" because "stone" is used as the first part, and "axe", which is set for "one-handed sword", is used as the third part.

Figure 21:
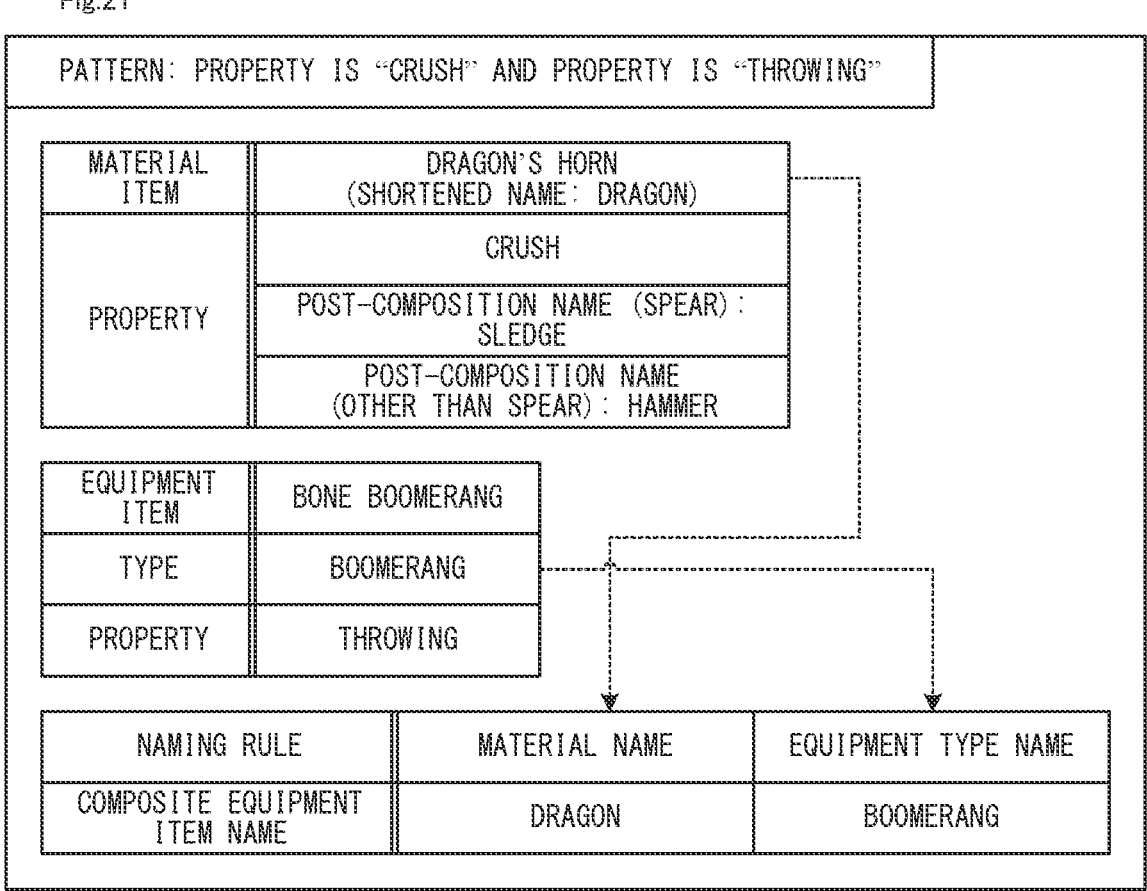
FIG. 21 shows an example of generation of a name of a composite equipment item that is generated by compositing a material item "dragon's horn" and an equipment item "bone boomerang"

Specific Example 6: Naming Rule 3 when a Plurality of Types of Post-Composition Names are Set FIG. 21 shows an example of generation of a name of a composite equipment item that is generated by compositing the material item "dragon's horn" and an equipment item "bone boomerang". In the example shown in FIG. 21, the material item "dragon's horn" is the same as that shown in FIG. 19. In the example shown in FIG. 21, "boomerang" is set as the type of the equipment item "bone boomerang", and "throwing" indicating that a throwing attack is possible is set as the property of the equipment item.

The composite equipment item generated by compositing the material item "dragon's horn" and the equipment item "bone boomerang" shown in FIG. 21 has, for example, an appearance in which the horn is attached to an end of the boomerang, and has the effect of "crush" as described above.

The pattern of the material item and the equipment item in the example shown in FIG. 21 matches the pattern condition that the properties of "crush" and "throwing" should be included (pattern condition whose priority is 7 in the correspondence information shown in FIG. 15). Therefore, in the example shown in FIG. 21, the naming rule corresponding to this pattern condition is applied to generate the name of the composite equipment item.

In the example shown in FIG. 21, the applied naming rule is to use the name of the material item as the first part, omit the second part, and use the type name of the equipment item as the third part. As described above, in the example shown in FIG. 21, "dragon" is set as a shortened name of the material item, and the type of the equipment item is "boomerang". Therefore, the name of the composite equipment item generated according to the above naming rule is "dragon boomerang".

In the exemplary embodiment, an example as follows is used as another example of using the pattern condition regarding the property of the equipment item, like the example shown in FIG. 21. That is, in the exemplary embodiment, the correspondence information shown in FIG. 15 includes: a pattern condition that the property of "throwing" should be included; and a naming rule to use the name of the material item as the first part, omit the second part, and use the type name of the equipment item as the third part, as a combination of a pattern condition and a naming rule whose priority is 11. Thus, the pattern condition may be determined based on the property of the equipment item while the property of the material item is optional. For example, when the material item "small stone" whose shortened name is "stone" is composited with the equipment item "bone boomerang", the combination of the material item and the equipment item matches the above pattern condition. As a result, the name of the composite equipment item becomes "stone boomerang".

As in the example shown in FIG. 21, even when the post-composition name is set for the material item, the game system 1 may generate the name of the composite equipment item by using the type name of the equipment item. According to the examples shown in FIGS. 19 to 21, the game system 1 may set a part, of the name of the composite equipment item, representing the type and/or the appearance (i.e., the third part) to the name according to the property set for the material item, or the name according to the type of the original equipment item. Thus, the game system 1 can generate an appropriate name following the appearance of the composite equipment item, for example.

Specific Example 7: Naming Rule 1 Using Property Name

Figure 22:
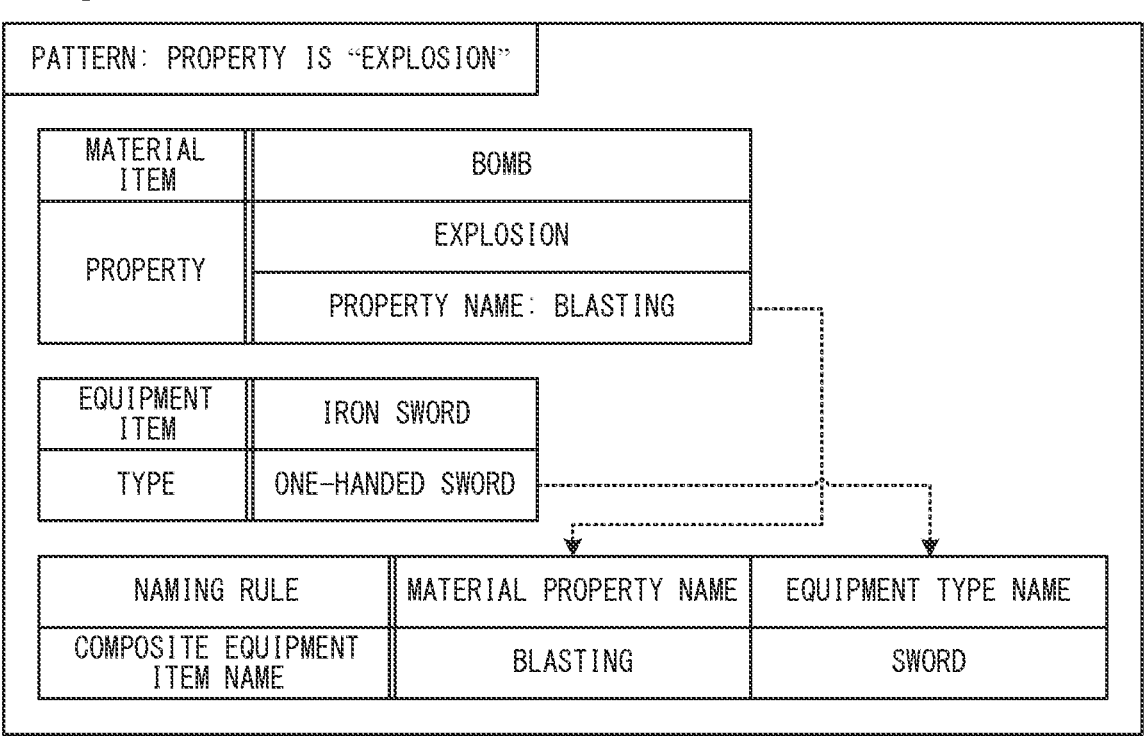
FIG. 22 shows an example of generation of a name of a composite equipment item that is generated by compositing a material item "bomb" and an equipment item "iron sword"

FIG. 22 shows an example of generation of a name of a composite equipment item that is generated by compositing a material item "bomb" and the equipment item "iron sword". In the example shown in FIG. 22, "explosion" representing the effect of explosion is set as the property of the material item "bomb", and "blasting" is set as the property name. In the example shown in FIG. 22, the equipment item "iron sword" is the same as that shown in FIG. 16.

The composite equipment item generated by compositing the material item "bomb" and the equipment item "iron sword" shown in FIG. 22 has, for example, an appearance in which the bomb is attached to the tip of the sword, and becomes capable of exerting the effect of "explosion". That is, when the player character has performed an attack action with the composite equipment item, the game system 1 executes a process of causing an explosion (e.g., a process of blowing up surrounding objects, or giving additional damages to surrounding enemy characters).

The pattern of the material item and the equipment item in the example shown in FIG. 22 matches the pattern condition that the property of "explosion" should be included (pattern condition whose priority is 10 in the correspondence information shown in FIG. 15). Therefore, in the example shown in FIG. 22, the naming rule corresponding to this pattern condition is applied to generate the name of the composite equipment item.

In the example shown in FIG. 22, the applied naming rule is to use the property name of the material item as the first part, omit the second part, and use the type name of the equipment item as the third part. As described above, in the example shown in FIG. 22, the property name of the material item is "blasting", and the type name of the equipment item is "sword". Therefore, the name of the composite equipment item generated according to the above naming rule is "blasting sword".

In the example shown in FIG. 22, as the name of the composite equipment item, the game system 1 generates the name associated with the material item and representing the property of the material item (i.e., the property name). The name thus generated allows the player to easily recognize the effect that the composite equipment item possesses due to the property of the material item (i.e., the effect at composition).

Specific Example 8: Naming Rule 2 Using Property Name

Figure 23:
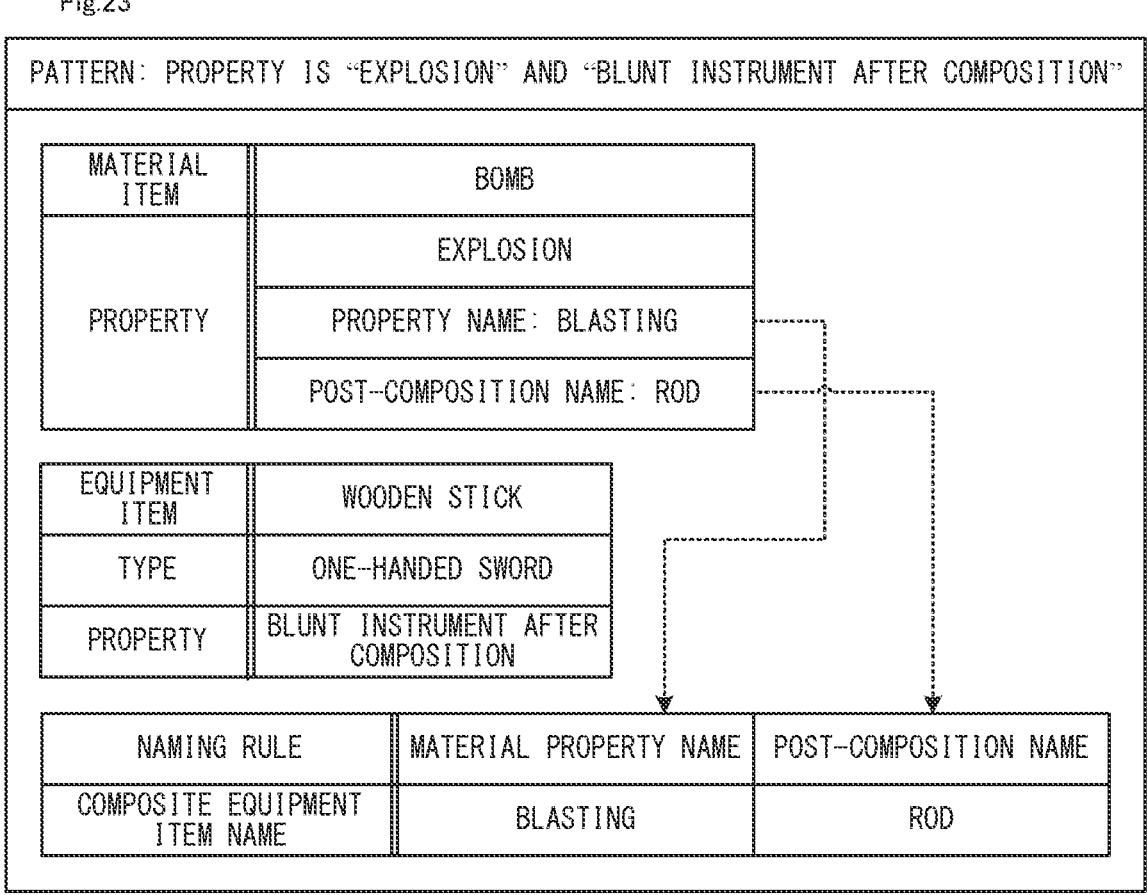
FIG. 23 shows an example of generation of a name of a composite equipment item that is generated by compositing a material item "bomb" and an equipment item "wooden stick"

FIG. 23 shows an example of generation of a name of a composite equipment item that is generated by compositing the material item "bomb" and the equipment item "wooden stick". In the example shown in FIG. 23, the material item "bomb" is the same as that shown in FIG. 22. For the material item "bomb", "rod" is set as a post-composition name. In addition, in the example shown in FIG. 23, the equipment item "wooden stick" is the same as that shown in FIG. 17.

The composite equipment item generated by compositing the material item "bomb" and the equipment item "wooden stick" shown in FIG. 23 has, for example, an appearance in which the bomb is attached to the tip of the wooden stick, and becomes capable of exerting the effect of "explosion".

The pattern of the material item and the equipment item in the example shown in FIG. 23 matches the pattern condition that the properties of "explosion" and "blunt instrument after composition" should be included (pattern condition whose priority is 9 in the correspondence information shown in FIG. 15). Therefore, in the example shown in FIG. 23, the naming rule corresponding to this pattern condition is applied to generate the name of the composite equipment item.

In the example shown in FIG. 23, the applied naming rule is to use the property name of the material item as the first part, omit the second part, and use the post-composition name as the third part. As described above, in the example shown in FIG. 23, the property name of the material item is "blasting", and the post-composition name is "rod". Therefore, the name of the composite equipment item generated according to the above naming rule is "blasting rod".

As in the examples shown in FIGS. 22 and 23, even in the case where the property name is used as the name of the composite equipment item, the name of the composite equipment item can be generated according to different naming rules by using the different naming rules depending on the equipment item (specifically, the type or property of the equipment item). For example, as described above, the name of the composite equipment item suitable for the appearance thereof can be easily generated by changing the third part (i.e., the name representing the type or appearance of the composite equipment item) according to the type or property of the equipment item.

Specific Example 9: Naming Rule when Material Item is Equipment Item

Figure 24:
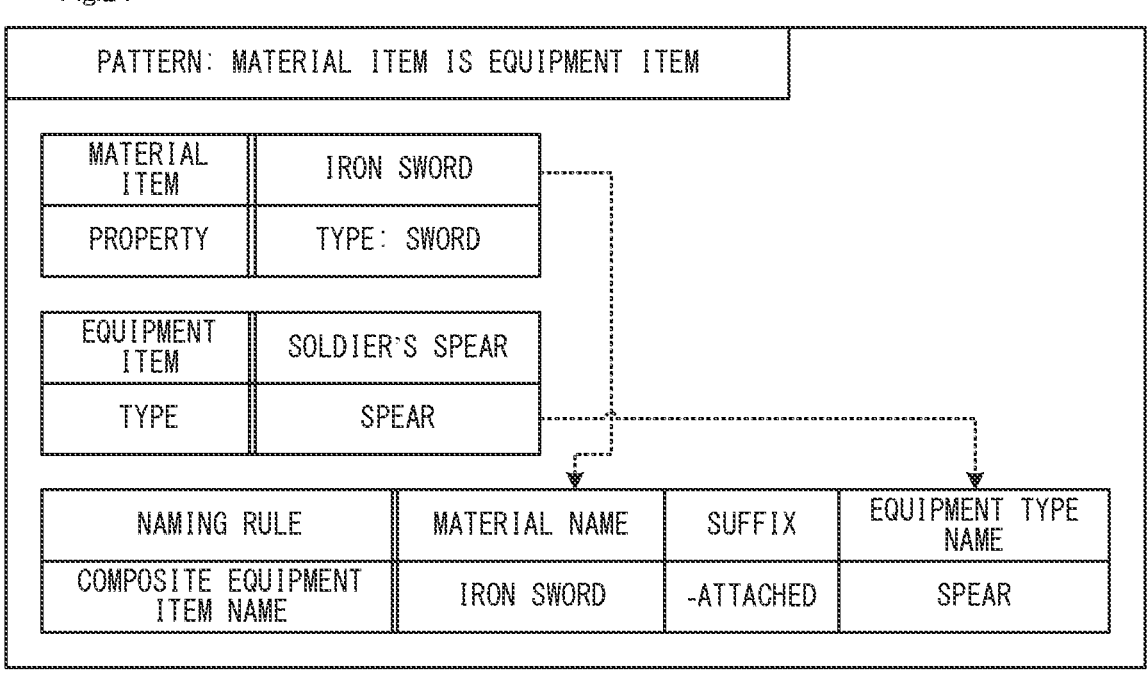
FIG. 24 shows an example of generation of a name of a composite equipment item that is generated by compositing a material item "iron sword" and an equipment item "wooden spear"

FIG. 24 shows an example of generation of a name of a composite equipment item that is generated by compositing the material item "iron sword" and an equipment item "wooden spear". In the example shown in FIG. 24, the equipment item "iron sword" shown in FIG. 16, etc., is used as a material item. In addition, in the example shown in FIG. 24, the equipment item "soldier's spear" is the same as that shown in FIG. 19. The composite equipment item generated by compositing the material item "iron sword" and the equipment item "wooden spear" shown in FIG. 24 has an appearance in which the sword is attached to the tip of the spear.

The pattern of the material item and the equipment item in the example shown in FIG. 24 matches the pattern condition that the material item should be the equipment item (pattern condition whose priority is 2 in the correspondence information shown in FIG. 15). Therefore, in the example shown in FIG. 24, the naming rule corresponding to this pattern condition is applied to generate the name of the composite equipment item.

In the example shown in FIG. 24, the applied naming rule is to use the name of the material item as the first part, use "-attached" as the second part, and use the type name of the equipment item as the third part. As described above, in the example shown in FIG. 24, the name of the material item is "iron sword", and the type name of the equipment item is "spear". Therefore, the name of the composite equipment item generated according to the above naming rule is "iron sword-attached spear". In the exemplary embodiment, in the case where the first part becomes the name of the equipment item in performing composition with the equipment item being used as the material item, the name of the equipment item is used. However, the shortened name (or the type name) of the equipment item may be used as the first part.

As in the example shown in FIG. 24, the game system 1 may generate the composite equipment item with the equipment item as the material item. In this case, the game system 1 generates the name including: the name representing the equipment item used as the material item (i.e., the name or shortened name of the equipment item); and the name representing the type and/or the appearance of the equipment item to be composited with the material item (i.e., the type name). The name thus generated allows the player to easily recall the original equipment item, and easily understand the name as the name of the composite equipment item.

As described above, in the exemplary embodiment, at least any one of the plurality of equipment items that appear in the game can be composited as a material item with another equipment item. Thus, the number of generable composite equipment items can be increased, thereby increasing the types of items. In other embodiments, the equipment items may be items of types that cannot be used for composition as material items.

Specific Example 10: Naming Rule when Specific Name is Given

FIG. 25 shows an example of determination of a name of a composite equipment item with respect to a specific equipment item, to a predetermined specific name. In the example shown in FIG. 25, the material item "ruby" is the same as that shown in FIG. 16. In addition, "special equipment" is set as the property of the specific equipment item (named as "○○" in FIG. 16).

The pattern of the material item and the equipment item in the example shown in FIG. 25 matches the pattern condition that the property of "special equipment" should be included (pattern condition whose priority is 1 in the correspondence information shown in FIG. 15). Therefore, in the example shown in FIG. 25, the naming rule corresponding to this pattern condition is applied to generate the name of the composite equipment item.

In the example shown in FIG. 25, the applied naming rule is to use a specific name (described as "○○" in FIG. 25) as the name of the composite equipment item. Therefore, in the example shown in FIG. 25, the name of the composite equipment item becomes the specific name, regardless of the names set for the material item and the equipment item (i.e., the name of the material item or the equipment item, the shortened name, the type name, the post-composition name, and the property name).

As in the example shown in FIG. 25, the naming rule may be a rule to use the specific name as the name of the composite equipment item under a certain condition. This allows the name of the composite equipment item to be generated regardless of the original material item, and allows the name of the original equipment item to be used as it is, as the name of the composite equipment item. Therefore, the name of the composite equipment item can be generated more freely.

As in the examples shown in FIGS. 16 to 25, in the exemplary embodiment, the game system 1 determines the third part of the composite equipment item to be either (a) the name representing the type of the equipment item (i.e., the type name), or (b) the name that is determined based on the effect at composition (i.e., the property) associated with the material item and/or based on the type or performance associated with the equipment item, and that represents the type and/or the appearance of the composite equipment item (i.e., the name represented by the property data of the equipment item, or the post-composition name set for the material item). Thus, the name of the composite equipment item can be determined so as to represent the type and/or the appearance thereof, thereby reducing the possibility that the name becomes unnatural.

In the exemplary embodiment, like the two pattern conditions shown in FIGS. 16 and 17, the three pattern conditions shown in FIGS. 19 to 21, and the two pattern conditions shown in FIGS. 22 and 23, it is conceivable that a combination of an original material item and an original equipment item may match a plurality of pattern conditions in the correspondence information. In the exemplary embodiment, the game system 1 discriminates the pattern conditions, based on the priorities set for the respective pattern conditions, to specify one pattern condition corresponding to the naming rule to be used for name generation in the above case.

Specifically, the game system 1 discriminates the pattern conditions included in the correspondence information in the descending order of the priorities (i.e., from the smallest priority number in order), and when a pattern condition that matches the combination of the original material item and the original equipment item is found, the game system 1 uses the naming rule corresponding to the pattern condition. For example, a case where the combination of the original material item and the original equipment item matches the pattern condition whose priority is 4 in the example shown in FIG. 15, is considered. In this case, as a result of discriminating the pattern conditions in the descending order of the priorities, the game system 1 firstly determines that the pattern condition whose priority is 4 matches the above combination, and determines to use the naming rule corresponding to the pattern condition. Although the above combination also matches the pattern condition whose priority is 5, since this pattern condition has not yet been subjected to discrimination, the naming rule corresponding to this pattern condition is not used. In the exemplary embodiment, even when the combination of the original material item and the original equipment item matches the plurality of pattern conditions as described above, the game system 1 can uniquely specify the naming rule to be used.

In the example of the correspondence information shown in FIG. 15, a combination of a pattern condition and a naming rule for giving a specific name to a specific composite equipment item is given the priority "1". Therefore, regardless of the property set for the material item, the game system 1 can apply the above naming rule to the specific equipment item (i.e., the equipment item for which the property of "special equipment" is set).

In the example of the correspondence information shown in FIG. 15, as a pattern condition having the second lowest priority (i.e., 14) and a pattern condition having the lowest priority (i.e., 15), a pattern condition including the property of "blunt instrument" and a pattern condition including the property of "edged tool" are set, respectively. In the exemplary embodiment, it is assumed that either the property of "blunt instrument" or the property of "edged tool" is set for all the equipment items. Therefore, all the combinations of the original material items and the original equipment items match either the pattern condition including the property of "blunt instrument" or the pattern condition including the property of "edged tool". Thus, in the exemplary embodiment, each of all the combinations of the original material items and the original equipment items can be matched to any one of the pattern conditions in the correspondence information shown in FIG. 15. Therefore, it is possible to avoid a disadvantage that a naming rule to be used is not determined (because there is no pattern condition that matches the combination of the original material item and the original equipment item).

As described above, in the exemplary embodiment, the game system 1 determines the first part, the second part, and the third part, based on a preset naming rule corresponding to a pattern that matches a combination of an original material item and an original equipment item, among a plurality of patterns (specifically, the pattern conditions shown in FIG. 15) set in advance with respect to a combination of: any of pieces of information associated with a material item (specifically, information regarding the name or the property of the material item); and any of pieces of information associated with an equipment item (specifically, information regarding the name, the type, or the property of the equipment item). Thus, the naming rule for generating a name of a composite equipment item can be varied depending on the properties of the original items. As a result, an appropriate naming rule can be used according to the composite equipment item, and therefore, an appropriate name, such as a name suitable for the appearance of the composite equipment item, can be easily generated. In other embodiments, the naming rule determination method is not limited to the aforementioned method of determining a naming rule based on association between the pattern and the naming rule.

In the exemplary embodiment, the priority order is set for the plurality of pattern conditions (see FIG. 15). A naming rule to be used for generating a name of a composite equipment item is specified based on the priority order. That is, the game system 1 determines the first part, the second part, and the third part, based on a naming rule corresponding to a pattern that matches a combination of an original material item and an original equipment item and that is specified based on the priority order. Thus, even when there are a plurality of pattern conditions that match the above combination, the game system 1 can uniquely determine a naming rule. In other embodiments, the priority order may not necessarily be set for the pattern conditions. For example, a naming rule may be uniquely determined by setting the content of each pattern condition such that one pattern condition matches a combination of an original material item and an original equipment item.

The phrase "determining based on the priority order" is not limited to the method for searching for a pattern condition that matches a combination of an original material item and an original equipment item as in the exemplary embodiment. For example, in other embodiments, the game system 1 may determine, for all the pattern conditions, whether or not to match the above combination, and may determine, as a naming rule to be used for determining a name of a composite equipment item, a naming rule corresponding to a pattern condition of the highest priority among matching pattern conditions. Also in this case, the same effects as in the exemplary embodiment can be achieved.

In the exemplary embodiment, among the pattern conditions in the correspondence information, the pattern conditions whose priorities are 3 to 10, 12, and 13 can be regarded as conditions that designate the effect at composition (property) of the material item, while the other pattern conditions can be regarded as conditions designating that the effect of the material item at composition is optional. That is, in the exemplary embodiment, the pattern conditions in the correspondence information can be regarded as conditions regarding the effects at composition associated with the material items. Thus, in the exemplary embodiment, each of the plurality of pattern conditions is set as a pattern of a combination of information on the effect at composition associated with a material item, and one of pieces of information associated with an equipment item. Therefore, according to the exemplary embodiment, the name of the composite equipment item can be generated according to the effect at composition of the material item. According to the exemplary embodiment, the name of the composite equipment item can be generated with different naming rules according to the effect at composition. Therefore, for example, as for a composite equipment item that exerts a predetermined effect at composition, the name thereof can be generated so as to include a part (e.g., the property name) that allows the player to recall the effect.

In the exemplary embodiment, as described in the examples shown in FIGS. 16 to 22, the game system 1 gives, to the composite equipment item, the property of the original material item (i.e., the effect at composition). That is, when the player character has used the composite equipment item according to an operation input performed by the player (e.g., when the player character has performed an attack action with the composite equipment item), the game system 1 executes a process of generating an effect (e.g., magic attack, range expansion, crush, explosion, etc.) according to the effect at composition that is associated with the composite equipment item. Therefore, according to the exemplary embodiment, the game system 1 can generate the name of the composite equipment item so that the function when the composite equipment item is used (i.e., the effect due to the composite equipment item) is easily understandable for the player. Here, the effect at composition is not limited to the effect caused by use of the composite equipment item, and may be generated in the state where the player character is equipped with the composite equipment item, or may be generated under a certain condition (e.g., according to the player character being attacked).

In the exemplary embodiment, the game system 1 generates the names of composite equipment items by combining four types of names as follows: (a) a name representing a material item (i.e., the name or shortened name of the material item), (b) a name representing the property of the material item (i.e., the property name), and (c) a name representing the type/appearance of a composite equipment item (i.e., the post-composition name), which are associated with the material item; and (d) a name associated with an equipment item and representing the type of the equipment item (i.e., the type name). Thus, a variety of names based on the above combinations can be generated, and appropriate names suitable for the property and the appearance of the composite equipment item can be easily generated.

The above-described pattern conditions and naming rules shown in FIGS. 15 to 25 are examples. In other embodiments, pattern conditions different from those described above may be used, and naming rules different from those described above may be used.

In the correspondence information in which the patterns are associated with the naming rules, even if the patterns of the material items and the equipment items are uniform, different naming rules may be set depending on the languages used in the game.

For example, in the examples shown in FIGS. 16 and 17 the second part is "-tipped". However, the second part may be omitted. That is, the naming rule in the examples shown in FIGS. 16 and 17 may be to use the name of the material item as the first part, omit the second part, and use the type name of the equipment item as the third part. Specifically, in the example shown in FIG. 16, the name of the composite equipment item generated according to the above naming rule is "ruby sword".

In addition, for example, in the example shown in FIG. 24, when the language is English, the second part is "-attached". However, according to the language, the second part may be another suffix, may be a postpositional particle, or may be omitted.

The data configurations of the material item data and the equipment item data may differ from language to language used in the game, to make the composite equipment item naming rule differ from language to language. For example, as for the material item "goblin's horn" in the example shown in FIG. 13, when the language is English, "smasher" is set as the post-composition name when the type of the equipment item is "one-handed sword", and "pounder" is set as the post-composition name when the type of the equipment item is "two-handed sword". Meanwhile, when the language is not English, the same post-composition name may be set regardless of whether the type of the equipment item is "one-handed sword" or "two-handed sword".

Figure 10:
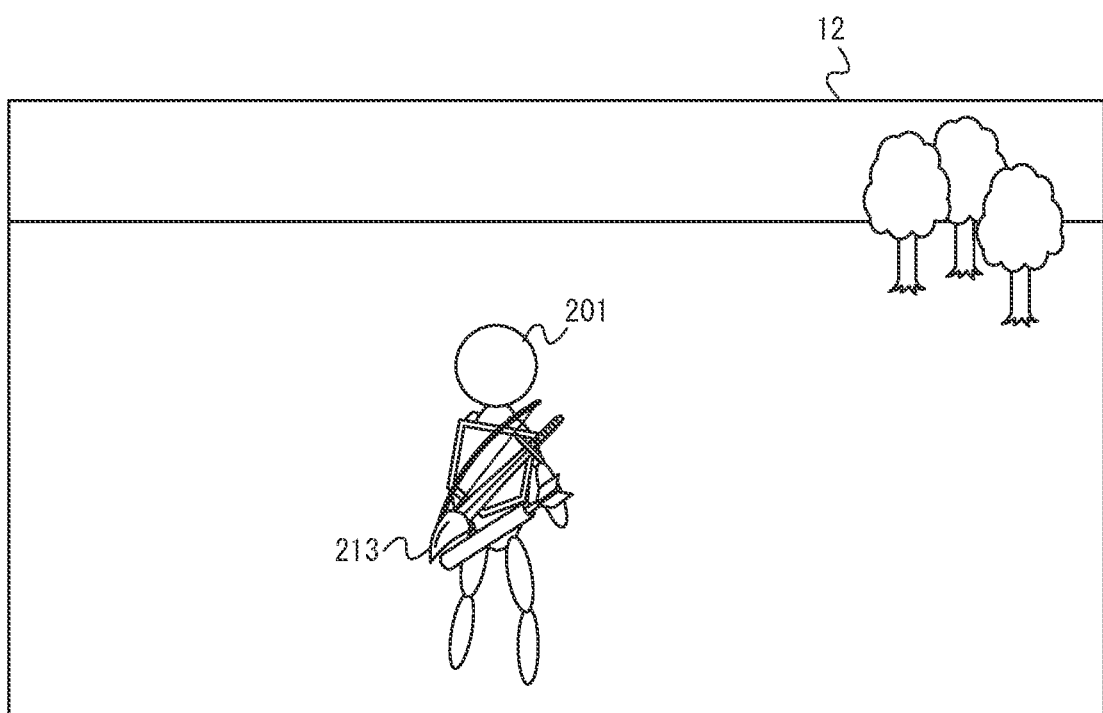
FIG. 10 shows an example of a game image including the player character equipped with a generated composite equipment item.

In the exemplary embodiment, a composite equipment item is generated when composition is performed in response to an instruction of the player, through the method shown in FIGS. 8 to 10. However, a composite equipment item may be generated according to another condition (e.g., a character other than the player character performing composition), or may be caused to appear when the game is started (e.g., may be placed on the game field, or possessed by an enemy character). When the composite equipment item is generated according to the method shown in FIGS. 8 to 10, the composite equipment item becomes to be possessed by the player character according to composition. Meanwhile, when the composite equipment item is generated according to another condition or is caused to appear when the game is started, the composite equipment item is not possessed by the player character at the time of composition, and thereafter, may occasionally be possessed by the player character (e.g., when the player character picks up the composite equipment item lying on the game field).

In the exemplary embodiment, the game system 1 generates the name of the composite equipment item in response to that the player character possesses the composite equipment item. However, there is no limitation on the timing to generate the name of the composite equipment item, and the game system 1 may generate the name in response to that the composite equipment item appears in the game field. For example, when the name of the composite equipment item is displayed in a list image described later (i.e., a list image showing the items possessed by the player character), the game system 1 may generate the name at the timing when the list image is displayed. For example, when the name of the composite equipment item placed on the game field is displayed, the game system 1 may generate the name in response to that the composite equipment item is generated and placed on the game field.

[2-3. Method for Generating Icon Image of Composite Equipment Item]

Figure 27:
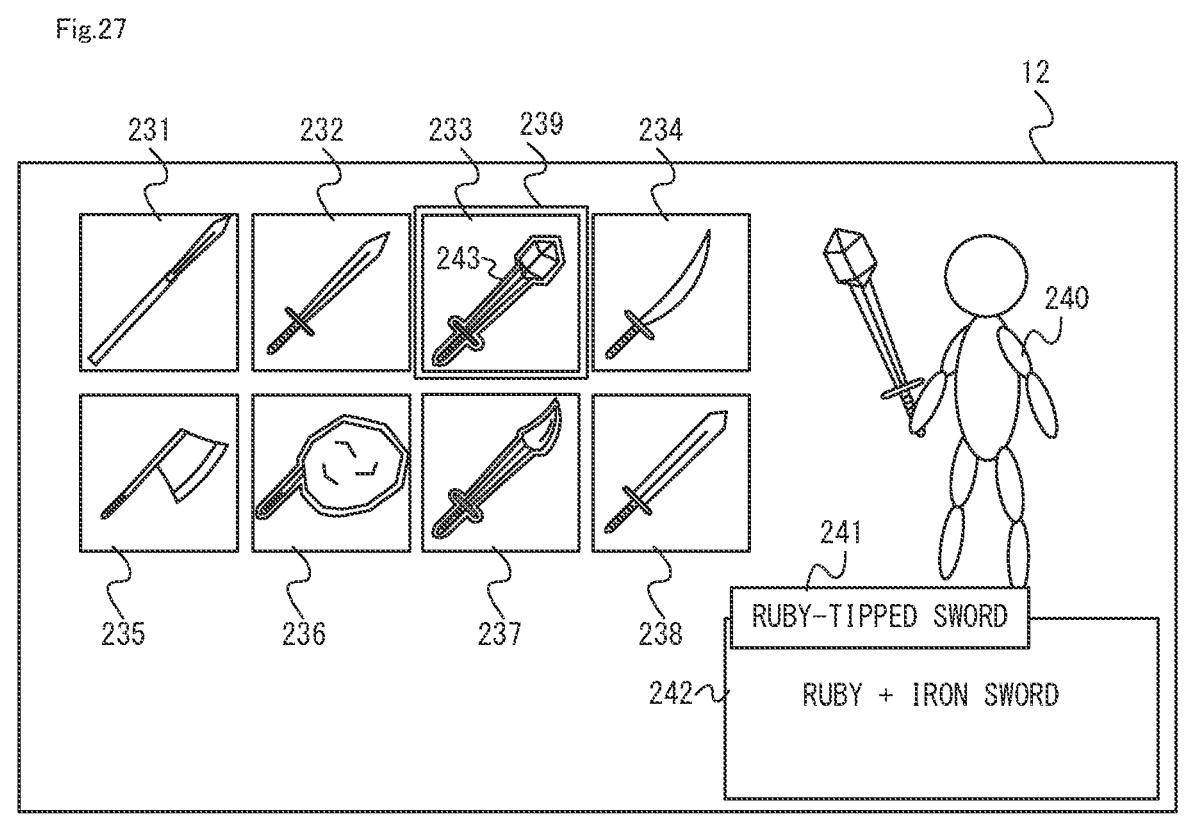

In the exemplary embodiment, a list image indicating a list of equipment items and composite equipment items possessed by the player character is displayed in response to an instruction performed by the player during the game (see FIG. 27). In the list image, icon images indicating the equipment items and the composite equipment items possessed by the player character are displayed.

If the game system 1 stores therein in advance the icon images of all the composite equipment items that can be generated, the game system should store therein the icon images for all the combinations of equipment items and material items that can be composited with the equipment items, which may result in an increase in the amount of data stored in the game system 1. The amount of data is likely to be huge as the number of the combinations increases. Therefore, in the exemplary embodiment, when a composite equipment item is generated and possessed by the player character, an icon image of the composite equipment item is newly generated. In this case, the game system 1 need not store therein in advance data of the icon image of the composite equipment item, thereby reducing the amount of data stored in the game system 1. Hereinafter, a method for generating an icon image of a composite equipment item will be described.

FIG. 26 shows an example of the method for generating an icon image of a composite equipment item. FIG. 26 shows an exemplary case of generating an icon image of the composite equipment item 213 by using the tusk object 206 and the sword object 202 shown in FIG. 8 as a material item and an equipment item, respectively.

In the exemplary embodiment, the game system 1 prepares in advance a three-dimensional model 206 of the original material item and a three-dimensional model 202 of the equipment item (see (a) of FIG. 26). For example, data of these three-dimensional models are stored in advance in the game system 1 together with the game program. In the exemplary embodiment, the game system 1 generates the icon image of the composite equipment item by using these three-dimensional models.

The three-dimensional model used for generating the icon image of the composite equipment item may be the same or different from the three-dimensional model for drawing the material item or the equipment item present in the game field. If the three-dimensional model for generating the icon image is the same as the three-dimensional model for drawing the item present in the game field, the amount of data of the three-dimensional model stored in the game system 1 can be reduced. If the three-dimensional model for generating the icon image is different from the three-dimensional model for drawing the item present in the game field, these three-dimensional models may have similar appearances such that the player recognizes that these models correspond to the same item. If the three-dimensional models are different from each other, for example, the amount of data of one three-dimensional model is made smaller (i.e., specificity thereof is made lower) than that of the other three-dimensional model, whereby the load of processing using the one three-dimensional model (i.e., a process of generating an icon image, or a process of drawing an item present in the game field) can be reduced.

In generating an icon image, firstly, the game system 1 generates a three-dimensional model 213 of a composite equipment item, based on the three-dimensional models of the original material item and the original equipment item (see (b) of FIG. 26). For example, the game system 1 attaches (or disposes) the three-dimensional model 206 of the material item to the three-dimensional model 202 of the equipment item to generate the three-dimensional model 213 of the composite equipment item. There is no limitation on the specific method for generating the three-dimensional model of the composite equipment item by using the three-dimensional models of the material item and the equipment item. For example, the game system 1 may generate the three-dimensional model of the composite equipment item by replacing a part of the three-dimensional model of the equipment item with the three-dimensional model of the material item. For example, in order to make a part near the boundary of the two three-dimensional models natural in appearance, the game system 1 may apply certain processing to this part.

Next, the game system 1 captures an image of the three-dimensional model 213 of the composite equipment item with a virtual camera 221 to generate an icon image of the composite equipment item (see (c) of FIG. 26). That is, the icon image of the composite equipment item is generated as an image when the three-dimensional model 213 is viewed from the position of the virtual camera 221.

In the exemplary embodiment, the game system 1 sets the position and the angle of view of the virtual camera 221 with respect to the three-dimensional model 213 of the composite equipment item such that the entire three-dimensional model 213 is within the imaging range of the virtual camera 221. For example, as for the material item and the equipment item that are the origins of the composite equipment item, if boundary boxes are set for the respective items so as to enclose the items, the virtual camera is set such that the boundary boxes are within the imaging range, whereby the entire three-dimensional model of the composite equipment item can be within the imaging range of the virtual camera. In this case, even if different composite equipment items have different actual sizes in the game field (i.e., the sizes when the items are placed in the game field), an icon image representing the entirety of each composite equipment item can be generated.

The game system 1 may set the imaging range of the virtual camera 221 such that, for example, the length of a margin in the icon image (i.e., the distance from an end of the composite equipment item to the boundary of the imaging range) varies depending on the size of the composite equipment item. Specifically, the length of the margin may be set longer for a smaller composite equipment item, and the length of the margin may be set shorter for a larger composite equipment item. Thus, the size of the composite equipment item in the game field can be reflected in the icon image to some extent but not completely.

The game system 1 sets the orientation of the virtual camera 221 with respect to the three-dimensional model 213 such that the orientation of the composite equipment item is the same as the orientation of the equipment item in the icon image of the original equipment item. In the exemplary embodiment, the icon images of the original equipment items are prepared in advance. The icon image represents the equipment item as viewed in a predetermined orientation. The predetermined orientation may be the same or different for each equipment item. The predetermined orientation may be set for each type of equipment item. As for the composite equipment item generated based on the equipment item, the game system 1 sets the orientation of the virtual camera 221 such that the orientation of the three-dimensional model of the composite equipment item with respect to the virtual camera 221 is the same as the predetermined orientation regarding the equipment item. Thus, the orientation of the composite equipment item in the icon image of the composite equipment item is the same as the orientation of the original equipment item in the icon image of the equipment item (see FIG. 27 described later).

In other embodiments, the icon image of the equipment item may not necessarily be prepared in advance, and may be generated during the game, like the composite equipment item. In this case, the icon image of the equipment item is generated by setting the orientation of the virtual camera 221 such that the orientation of the three-dimensional model of the equipment item with respect to the virtual camera 221 is the predetermined orientation regarding the equipment item.

In the exemplary embodiment, as for the composite equipment item based on the equipment item for which the property of "special equipment" described above is set, the appearance of the composite equipment item is changed only while the player character is performing an action (e.g., attack action) using the composite equipment item, and the appearance during the normal time is not changed from the original equipment item. Therefore, as for the composite equipment item, the game system 1 does not newly generate an icon image, and uses the icon image of the original equipment item. Thus, the game system 1 may not generate an icon image for a specific composite equipment item (e.g., a composite equipment item whose appearance does not change from that of the original equipment item).

[2-4. List Image]

In the exemplary embodiment, the game system 1 displays a list image of equipment items and composite equipment items possessed by the player character, in response to an instruction performed by the player during the game. For example, the list image is displayed in response to a predetermined list display instruction that is performed by the player in the state where the game image showing the game field including the player character is displayed.

FIG. 27 shows an example of the list image. In the example shown in FIG. 27, the list image shows a list of equipment items and composite equipment items possessed by the player character. However, in the list image, a list of material items may be shown together with the equipment items and the composite equipment items, or the list of the equipment items and the composite equipment items and the list of the material items may be switched and displayed (by the player selecting a tab).

As shown in FIG. 27, the list image includes icon images (eight icon images 231 to 238 in FIG. 27) of one or more equipment items and one or more composite equipment items possessed by the player character. The equipment items and the composite equipment items are common in terms of being items that the player character can be equipped with. Therefore, the list image including both the equipment items and the composite equipment items allows the player to readily confirm the items that the player character can be equipped with. In other embodiments, the game system 1 may display the list image of the equipment items and the list image of the composite equipment item separately from each other.

In the exemplary embodiment, the list image includes a cursor 239 operable by the player. In response to an instruction by the player, the game system 1 moves the cursor 239 such that any one of the icon images 231 to 238 is designated by the cursor 239. In the exemplary embodiment, the player can perform a predetermined operation on an item designated by the cursor 239. Specifically, in the state where the list image is displayed, the game system 1 receives at least an equipment instruction and a composition cancel instruction.

The equipment instruction is an instruction to cause the player character to be equipped with the item designated by the cursor 239. In response to the equipment instruction performed by the player, the game system 1 causes the player character to be equipped with the designated item.

The composition cancel instruction is an instruction to, when the designated item is a composite equipment item, cancel the composite equipment item and return the same to the original equipment item. In response to the composition cancel instruction performed by the player, the game system 1 returns the designated composite equipment item to the state in which the original material item is deleted from the composite equipment item (i.e., returns it the original equipment item). At this time, the original material item may be possessed by the player character, or may be disappeared.

As shown in FIG. 27, the list image includes a character image 240 indicating the player character equipped with the equipment item or the composite equipment item designated by the cursor 239. In the example shown in FIG. 27, the character image 240 shows the player character equipped with the composite equipment item "ruby-tipped sword" represented by an icon image 233 designated by the cursor 239. The character image 240 allows the player to confirm the appearance of the player character equipped with the designate equipment item or composite equipment item.

As shown in FIG. 27, the list image includes a name image 241 indicating the name of the equipment item or the composite equipment item designated by the cursor 239. In the example shown in FIG. 27, the name image 241 indicates "ruby-tipped sword" that is the name of the composite equipment item represented by the icon image 233 designated by the cursor 239. Thus, in the exemplary embodiment, in response to the instruction based on the operation input performed by the player (e.g., the list display instruction described above), the game system 1 displays the list image of the equipment items and the composite equipment item objects possessed by the player character such that the name of at least the designated equipment item or composite equipment item (e.g., the item being designated by the cursor) is shown. Therefore, when a composite equipment item is designated, the player can confirm the name of the composite equipment item by referring to the list image.

As described above, as for at least the designated equipment item or composite equipment item, the game system 1 displays the list image such that the name of the item is displayed in addition to the icon image. Thus, the list image provides the player with more specific information about the designated item.

In the list image, the names of the equipment items and the composite equipment items other than the designated equipment item or composite equipment item may be displayed. For example, in the list image, the icon images of the equipment items and the composite equipment items possessed by the player character may be displayed in association with the names thereof.

As shown in FIG. 27, the list image includes an explanation image 242 indicating an explanation about the equipment item or the composite equipment item designated by the cursor 239. In the example shown in FIG. 27, the explanation image 242 indicates an explanation about the composite equipment item "ruby-tipped sword" represented by the icon image 233 designated by the cursor 239. In the exemplary embodiment, the explanation image 242 about the composite equipment item indicates the names of the material item and the equipment item that are the origins of the composite equipment item. In the example shown in FIG. 27, the explanation image 242 about the composite equipment item "ruby-tipped sword" indicates the name of the original material item, "ruby", and the name of the original equipment item, "iron sword". The explanation image 242 is not limited to indicating the names of the original items of the composite equipment item, and may indicate any information about the equipment item or the composite equipment item designated by the cursor 239 (e.g., the property, performance, etc., set for this item).

As described above, in the exemplary embodiment, the game system 1 displays the list image such that, for at least a designated composite equipment item, the names of the material item and the equipment item that are the origins of the composite equipment item are further included in addition to the name of the composite equipment item. Thus, the list image presents, to the player, the original material item and the original equipment item of the composite equipment item. In other embodiments, the names of the original material item and the original equipment item may not necessarily be displayed in the list image.

In the list image, an original material item and an original equipment item of a composite equipment item other than the designated composite equipment item may be displayed. For example, in the list image, each of the icon images of the composite equipment items possessed by the player character may be displayed in association with the material item and the equipment item that are the origins of the composite equipment item.

As described above, in the exemplary embodiment, the orientation of the composite equipment item in the icon image of the composite equipment item is the same as the orientation of the original equipment item in the icon image of the original equipment item. For example, in the example shown in FIG. 27, the orientation of the equipment item "iron sword" indicated by the icon image 232 is the same as the orientation of the composite equipment item "ruby-tipped sword" generated based on the equipment item and indicated by the icon image 233 (i.e., in these icon images, the handle of the sword faces the lower left, and the tip of the sword faces the upper right).

As described above, in the exemplary embodiment, in order to generate an icon image of a composite equipment item, the game system 1 sets the virtual camera such that the orientation of the three-dimensional model of the composite equipment item with respect to the virtual camera becomes an orientation according to an orientation that is set in advance with respect to the equipment item (specifically, the same orientation as the set orientation) and the entire three-dimensional model falls within the imaging range of the virtual camera. Thus, the player can easily grasp how the appearance of the equipment item has been changed through composition, by comparing the icon image of the equipment item with the icon image of the composite equipment item based on the equipment item. In other embodiments, the icon image of the composite equipment item may be generated in any way, and the orientation of the composite equipment item object in the icon image may be different from the orientation of the original equipment item in the icon image of the equipment item.

In the exemplary embodiment, the game system 1 displays, in the list image, the icon image of the composite equipment item in a display mode different from that for the icon image of the equipment item. This allows the player to easily discriminate the icon image of the composite equipment item from the icon image of the equipment item in the list image. Specifically, in the exemplary embodiment, the icon image of the composite equipment item includes, in addition to an image of the composite equipment item, a contour surrounding the image (e.g., a contour 243 shown in FIG. 27). That is, the game system 1 generates, as the icon image of the composite equipment item, an icon image in which the contour is added to the image of the composite equipment item. The contour is added to each of the icon images of the composite equipment items included in the list image, regardless of whether or not the icon image is designated by the cursor 239. The contour allows the player to easily distinguish the icon images of the composite equipment items among the icon images in the list image.

Although not shown in the figures, in the exemplary embodiment, in displaying an icon image of an item (i.e., an equipment item, a composite equipment item, a material item, etc.) in the list image, the game system 1 may display the icon image to which a mark representing the property of the item is added. In the exemplary embodiment, since an equipment item and a composite equipment item are distinguished from each other according to presence/absence of a contour, it is possible to present, to the player, information (i.e., a contour) indicating whether an item is an equipment item or a composite equipment item and information (i.e., a mark) indicating the property of the item, without confusing them.

The specific method for displaying icon images of an equipment item and a composite equipment item in different display modes, is not limited to the method of the exemplary embodiment in which these items are distinguished from each other according to presence/absence of a contour, and any other method may be used. For example, in other embodiments, the game system 1 may use different background colors for the icon images of the composite equipment item and the equipment item, in addition to (or instead of) presence/absence of the contour. In other embodiments, the display modes for the icon images of the composite equipment item and the equipment item may be made different from each other by using predetermined marks added to the icon images. In other embodiments, the game system 1 may display the icon images of the equipment item and the composite equipment item in the same display mode.

Figure 28:
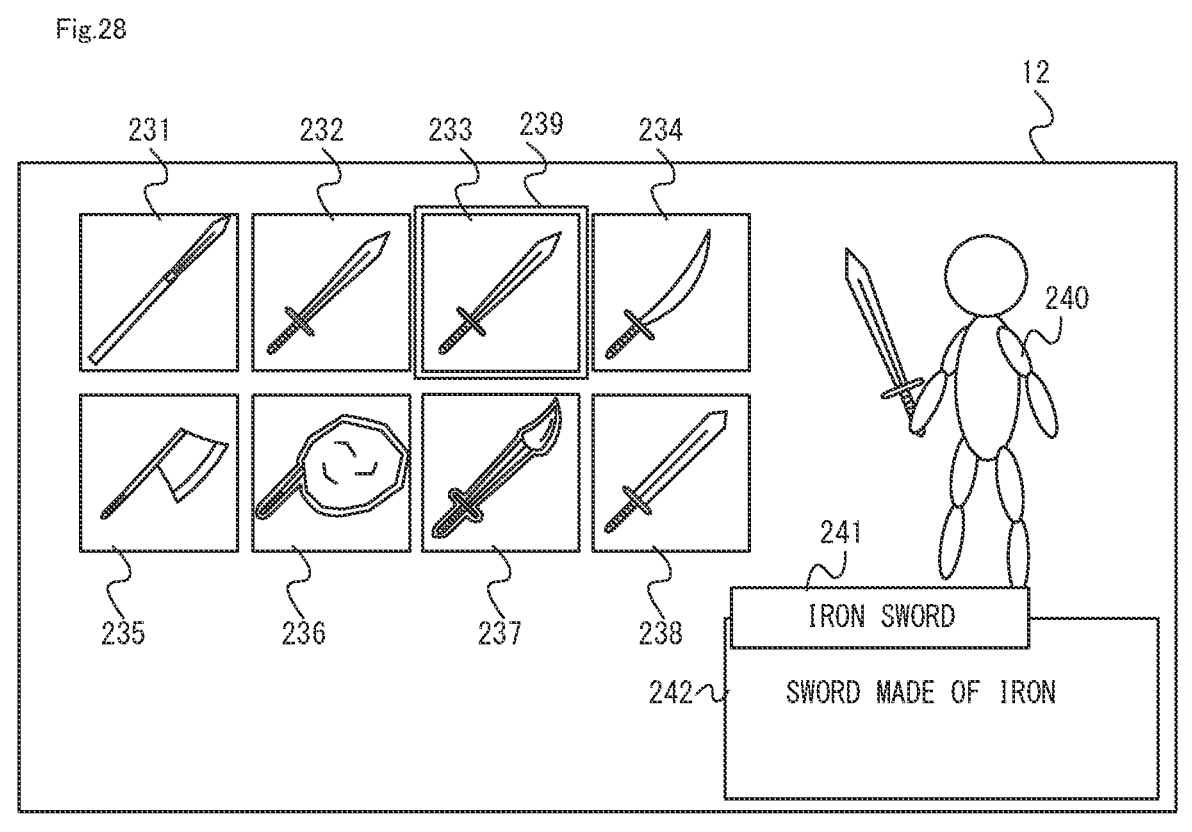

FIG. 28 shows an example of the list image when the above-described composition cancel instruction is performed on the designated composite equipment item in the situation shown in FIG. 27. In FIG. 28, as a result a composition cancel instruction performed on the "ruby-tipped sword" designated by the cursor 239 shown in FIG. 27, the icon image 233 is changed from the image showing the "ruby-tipped sword" to the image showing the "iron sword". In addition, the character image 240, the name image 241, and the explanation image 242 are also changed to the images regarding the "iron sword".

As described above, in the exemplary embodiment, while the list image is being displayed, the game system 1 performs the process of returning the composite equipment item possessed by the player character to the equipment item before composition, in response to the composition cancel instruction based on the operation input. In addition, the game system 1 changes the icon image of the composite equipment item in the list image to the icon image of the equipment item that is stored in advance. Thus, the content of the list image can be changed so as to reflect the cancellation of the composite equipment item.

In the exemplary embodiment, the game system 1 generates an icon image of a composite equipment item according to that the composite equipment has been possessed by the player character. Therefore, in the case where a composite equipment item is generated according to the method shown in FIGS. 8 to 10 in response to an instruction of the player, since the generated composite equipment item is possessed by the player character, the icon image of the composite equipment item is generated immediately after the generation. Meanwhile, as for a composite equipment item that is not possessed by the player character when it is generated (e.g., a composite equipment item placed on the game field), an icon image thereof is generated at a later timing when it is possessed by the player character. Thus, the game system 1 generates only the icon images to be used for generation of the list image, and therefore need not perform generation of unnecessary icon images, thereby improving the efficiency of processing. In other embodiments, an icon image of a composite equipment item may be generated at any timing. For example, the game system 1 may generate an icon image of a composite equipment item whose icon image has not yet been generated among the composite equipment items possessed by the player character, when the list image is displayed (i.e., when the list display instruction has been performed).

In the exemplary embodiment, when a composite equipment item is no longer possessed by the player character, the game system 1 deletes data of the icon image of this composite equipment item. Thus, the amount of data stored in the game system 1 can be reduced. A composite equipment item becomes no longer possessed by the player character when, for example, the composite equipment item disappears due to the composition cancel instruction, or when the player character discards the composite equipment item. Thereafter, if the composite equipment item is again possessed by the player character, the game system 1 again generates an icon image of the composite equipment item.

[3. Specific Example of Processing in Game System]

Next, a specific example of information processing in the game system 1 will be described with reference to FIGS. 29 to 32.

FIG. 29 shows an example of various types of data used for the information processing in the game system 1. The various types of data shown in FIG. 29 are stored in a storage medium (e.g., the flash memory 84, the DRAM 85, and/or the memory card attached to the slot 23) accessible by the main body apparatus 2.

As shown in FIG. 29, the game system 1 stores therein a game program. The game program is a game program for executing the game processing (specifically, the processes shown in FIGS. 30 to 32) of the exemplary embodiment.

Furthermore, the game system 1 stores therein the material item data (see FIG. 12), the equipment item data (see FIG. 14), correspondence information data, model data, and icon data. These data are prepared in advance, and are stored in the game system 1 together with the game program (or so as to be included in the game program), for example.

As described above, the material item data is data indicating the name, the property, etc., of each material item, and is stored for each material item. The equipment item data is data indicating the name, the property, etc., of each equipment item, and is stored for each equipment item. The correspondence information data is data indicating the correspondence information described above. The model data is data indicating the three-dimensional models of the material item and the equipment item. The icon data is data indicating the icon images of the material item and the equipment item.

Furthermore, the game system 1 stores therein possessed item data and composite item data as game processing data to be generated and used during the game processing. These data are stored in a memory (e.g., the DRAM 85) used for the game processing. These data are stored in the memory at an appropriate timing after the start of the game, and are appropriately updated according to the progress of the game.

The possessed item data is data indicating items (e.g., material items, equipment items, composite equipment items, etc.) possessed by the player character.

The composite item data indicates various types of information regarding a composite equipment item. The composite item data is stored in the memory for each composite equipment item. Specifically, the composite item data includes composite name data indicating the name of the composite equipment item, and composite icon data indicating an icon image of the composite equipment item. The composite item data includes, for example, data indicating the property of the composite equipment item, in addition to the above data.

Figure 30:
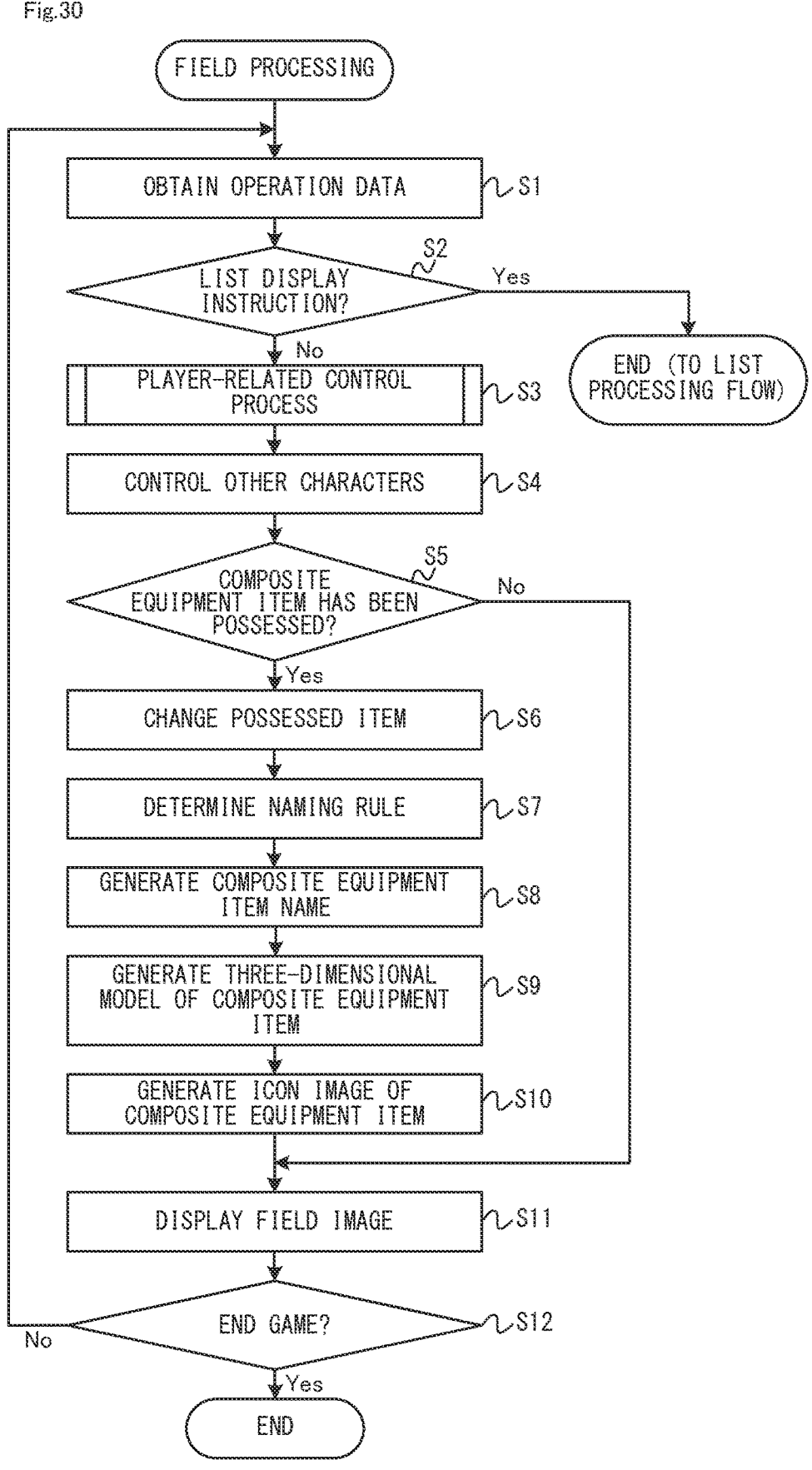
FIG. 30 is a flowchart showing a flow of field processing executed by the non-limiting game system.

FIG. 30 is a flowchart showing an example of a flow of field processing executed by the game system 1. The field processing is game processing executed in a scene in which the player character moves in the game field during the game. For example, the field processing is started when the player character is placed on the game field as the game is started.

In the exemplary embodiment, the processor 81 of the main body apparatus 2 executes the game program stored in the game system 1, thereby executing processes in steps shown in FIG. 30, and FIGS. 31 and 32 described later. However, in other embodiments, some of the processes in the steps may be executed by a processor (e.g., a dedicated circuit) other than the processor 81. When the game system 1 is communicable with another information processing apparatus (e.g., a server), some of the processes in the steps shown in FIGS. 30 to 32 may be executed by the another information processing apparatus. The processes in the steps shown in FIGS. 30 to 32 are merely examples, and as long as the same result is obtained, the order of the processes in the respective steps may be changed, or another process may be executed in addition to (or instead of) the process in each step.

Figure 31:
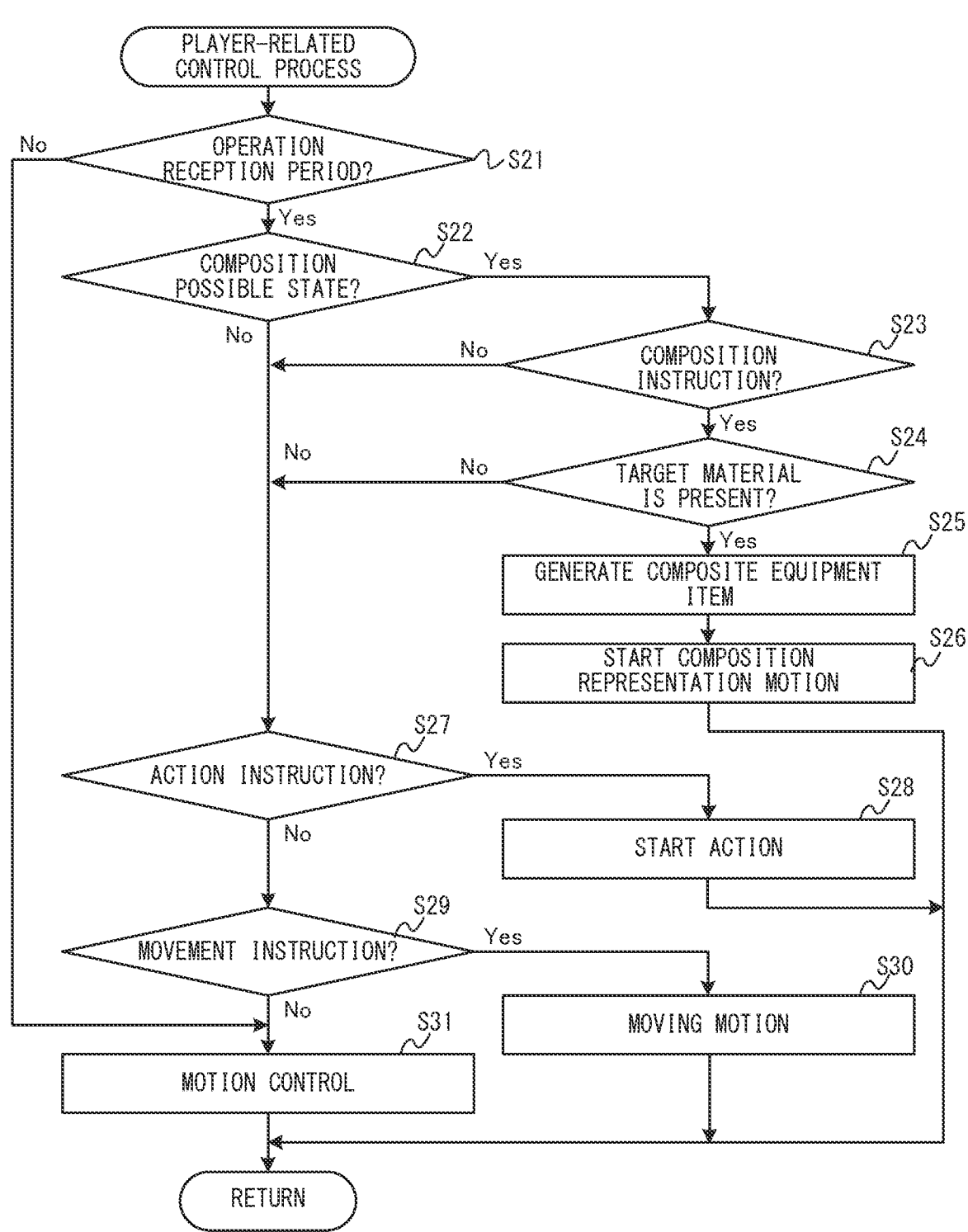
FIG. 31 is a sub flowchart showing an example of a specific flow of a player-related control process in step S3 shown in FIG. 30.

The processor 81 executes the processes in the steps shown in FIGS. 30 to 32 by using a memory (e.g., the DRAM 85). That is, the processor 81 stores information (in other words, data) obtained in each process step into the memory, and reads out the information from the memory when using the information for the subsequent process steps.

In step S1 shown in FIG. 30, the processor 81 obtains the operation data indicating an instruction by the player. That is, the processor 81 obtains the operation data that is received from each controller via the controller communication section 83 and/or the terminal 17 or 21. Next to step S1, the process in step S2 is executed.

In step S2, based on the operation data obtained in step S1, the processor 81 determines whether or not the list display instruction has been performed by the player. When the determination result in step S2 is positive, the processor 81 ends the field processing, and starts list processing described later (see FIG. 32). The list processing will be described later in detail. When the determination result in step S2 is negative, the process in step S3 is executed.

In step S3, the processor 81 executes a player-related control process. In the player-related control process, various types of processes (e.g., a control process related to the player character) are executed based on an operation input performed by the player. Hereinafter, the player-related control process will be described in detail with reference to FIG. 31.

FIG. 31 is a sub flowchart showing an example of a specific flow of the player-related control process in step S3 shown in FIG. 30. In the player-related control process, firstly, in step S21, the processor 81 determines whether or not it is an operation reception period during which an operation input to the player character can be received. In the exemplary embodiment, a motion period during which an object such as the player character performs a predetermined motion (e.g., a motion started in step S26 or S28 described later) in response to an operation input to the player character, is excluded from the operation reception period. When the determination result in step S21 is positive, the process in step S22 is executed. When the determination result in step S21 is negative, the process in step S31 described later is executed.

In step S22, the processor 81 determines whether or not the player character is in the composition possible state. The determination in step S22 is performed according to whether or not the player character can use a specific item for performing composition. For example, during the game, the player character may be controlled to be able to use any of a plurality of types of items including the specific item. In this case, the processor 81 determines that the player character is in the composition possible state if the player character is able to use the specific item, and determines that the player character is not in the composition possible state if the player character is able to use an item other than the specific item. When the determination result in step S22 is positive, the process in step S23 is executed. When the determination result in step S22 is negative, the process in step S27 described later is executed.

In step S23, based on the operation data obtained in step S1, the processor 81 determines whether or not an operation input for the composition instruction described above has been performed. As described above, in the exemplary embodiment, the composition instruction is an instruction to designate a target equipment item from among the options indicated by the equipment designation image described above (see FIG. 9). When the determination result in step S23 is positive, the process in step S24 is executed. When the determination result in step S23 is negative, the process in step S27 described later is executed.

In step S24, the processor 81 determines whether or not the target material item to be a target of composition is present in the vicinity of the player character. Specifically, the processor 81 determines whether or not a material item is present within the determination range based on the position and the orientation of the player character. When the determination result in step S24 is positive, the process in step S25 is executed. When the determination result in step S24 is negative, the process in step S27 described later is executed.

In step S25, the processor 81 generates a composite equipment item based on the target material item and the target equipment item. Specifically, the processor 81 reads out the model data of the target material item and the model data of the target equipment item from the storage medium of the game system 1, and generates a three-dimensional model of the composite equipment item to be placed on the game field, by using the read model data. In addition, the processor 81 reads out the material item data of the target material item and the equipment item data of the target equipment item from the storage medium of the game system 1, and sets the property of the composite equipment item by using the read data. Data of the three-dimensional model of the composite equipment item generated as described above, and data indicating the set property of the composite equipment item are stored in the memory as the composite item data. Next to step S25, the process in step S26 is executed.

If the composite equipment item appears in the game field in a case other than the case where the composite equipment item is generated according to the composition instruction performed by the player (e.g., in a case where the composite equipment item is placed on the game field when the game is started), the composition process similar to that in step S25 is executed at a timing when the composite equipment item appears in the game field. In this case, however, the process of generating a name and an icon image of the composite equipment item (steps S6 to S9 described later) need not be executed at the timing when the composite equipment item appears in the game field.

In step S26, the processor 81 causes a representation motion to start when compositing the target material item and the target equipment item. As described above, the representation motion for composition according to the exemplary embodiment is a series of motions in which the target material item is attracted toward the player character, and after the target material item has come close to the player character, the target equipment item that the player character is equipped with is changed to the composite equipment item generated in step S25. After the representation motion has started in step S26, the respective items are controlled to perform the representation motion over a predetermined period, according to a process in step S31 described later. After step S26, the processor 81 ends the player-related control process shown in FIG. 31.

In step S27, based on the operation data obtained in step S1, the processor 81 determines whether or not an operation input for an action instruction to the player character has been performed. The action instruction is an instruction for causing the player character to perform, for example, an attack motion, a jump motion, a motion of picking up an item on the game field, or the like. When the determination result in step S27 is positive, the process in step S28 is executed. When the determination result in step S27 is negative, the process in step S29 is executed.

In step S28, the processor 81 causes the player character to start a motion according to the action instruction performed in step S27. After the player character has started the motion in step S28, the player character is controlled to perform the motion over a predetermined period, according to the process in step S31 described later. After step S28, the processor 81 ends the player-related control process shown in FIG. 31.

In step S29, based on the operation data obtained in step S1, the processor 81 determines whether or not an operation input for a movement instruction to the player character has been performed. The movement instruction is an instruction for causing the player character to move on the game field. When the determination result in step S29 is positive, the process in step S30 is executed. When the determination result in step S29 is negative, the process in step S31 is executed.

In step S30, the processor 81 causes the player character to move on the field according to the movement instruction performed in step S29. After step S30, the processor 81 ends the player-related control process shown in FIG. 31.

In step S31, the processor 81 controls each object (specifically, the player character and the material item) so as to perform various types of motions such as a progress of the motion started in step S26 or S28, and a motion to be performed when there is no input by the player. In step S31 for the first time, the processor 81 controls each object to progress the motion for one-frame time. The process in step S31 being repeatedly executed over a plurality of frames allows each object to perform a series of motions according to the composition instruction or the action instruction.

In step S31, when the player character performs an action using the composite equipment item (e.g., an attack action using the composite equipment item), the processor 81 executes a process of exerting an effect according to the effect at composition set for the composite equipment item at the time of composition (i.e., the effect at composition set for the original material item and/or the original equipment item). For example, when an action with the composite equipment item on which the effect of "magic attack" described above is set is executed, the processor 81 executes a process of generating the magic attack (i.e., an attack of shooting a magic bullet).

If a motion that the player character should perform is not instructed by the player (e.g., if the motion started in step S26 or S28 has already ended), the processor 81, in step S31, need not cause the player character to perform a motion, or may cause the player character to perform a motion (e.g., looking around, or swinging) that makes the behavior of the player character natural. After step S31, the processor 81 ends the player-related control process shown in FIG. 31.

Referring back to FIG. 30, in step S4, the processor 81 controls the motion of a character (e.g., an enemy character) other than the player character. For example, when the another character is an enemy character, the processor 81 controls the motion of the enemy character according to an algorithm prescribed in the game program. In one step S4, the processor 81 controls each character to progress the motion for one-frame time. Next to step S4, the process in step S5 is executed.

In step S5, the processor 81 determines whether or not a composite equipment item is newly possessed by the player character. For example, when a composite equipment item has been generated in response to a composition instruction performed by the player (step S25) or when the player character has picked up a composite equipment item in response to an action instruction performed by the player (step S28), the processor 81 determines that a composite equipment item is newly possessed by the player character. When the determination result in step S5 is positive, the process in step S6 is executed. When the determination result in step S5 is negative, the processes in steps S6 to S10 are skipped, and the process in step S11 described later is executed.

In step S6, the processor 81 changes the item possessed by the player character. Specifically, the processor 81 updates the possessed item data stored in the memory so that the data includes the composite equipment item that has been determined in step S5 to be newly possessed. Furthermore, if the composite equipment item has been generated due to the composition instruction performed by the player, the processor 81 updates the possessed item data so that the original equipment item is deleted. Next to step S6, the process in step S7 is executed.

In step S7, the processor 81 determines a naming rule for generating a name of the composite equipment item newly possessed by the player character. Specifically, the processor 81 determines the naming rule to be used for generating the name, based on the pattern of the material item and the equipment item being the origins of the composite equipment item, while referring to the correspondence information data stored in the storage medium of the game system 1. The specific method for determining the naming rule is as described in the above [2-2. Method for generating name of composite equipment item]. Next to step S7, the process in step S8 is executed.

In step S8, the processor 81 generates the name of the composite equipment item newly possessed by the player character, according to the naming rule determined in step S7. Specifically, the processor 81 generates the name of the composite equipment item according to the method as described in the above [2-2. Method for generating name of composite equipment item], and stores data indicating the generated name in the memory as composite name data. Next to step S8, the process in step S9 is executed.

In step S9, the processor 81 generates a three-dimensional model of the composite equipment item newly possessed by the player character. Specifically, the processor 81 reads out the model data regarding the three-dimensional models of the original material item and the original equipment item from the storage medium of the game system 1, and generates the three-dimensional model of the composite equipment item, based on the read model data (see [2-3. Method for generating icon image of composite equipment item]). Next to step S9, the process in step S10 is executed.

In step S10, the processor 81 generates an icon image of the composite equipment item newly possessed by the player character. Specifically, the processor 81 generates the icon image by using the three-dimensional model generated in step S9, according to the method described in the above [2-3. Method for generating icon image of composite equipment item]. Data of the generated icon image is stored in the memory as composite icon data. Next to step S10, the process in step S11 is executed.

In step S11, the processor 81 generates a game image showing the game field, and displays the game image on the display 12. For example, the processor 81 sets a virtual camera in the game field so as to include the player character in the field-of-view range, and performs a drawing process based on the virtual camera to generate the game image showing the game field. Next to step S11, the process in step S12 is executed.

In step S12, the processor 81 determines whether or not to end the game. For example, when the player has performed a predetermined operation input to end the game, the processor 81 determines to end the game. When the determination result in step S12 is negative, the process in step S1 is again executed. Thereafter, a series of processes in steps S1 to S12 is repeatedly executed until it is determined in step S12 to end the game. When the determination result in step S12 is positive, the processor 81 ends the field processing shown in FIG. 30.

FIG. 32 is a flowchart showing an example of a flow of list processing executed by the game system 1. The list processing is game processing for displaying the list image (see FIG. 27) during the game. The list processing is started in response to a list display instruction having been performed by the player in the field processing.

In the list processing, firstly, in step S41, the processor 81 generates and displays a list image. Specifically, the processor 81 reads out the possessed item data from the storage medium of the game system 1, and reads out the icon data and the composite icon data regarding the items indicated by the possessed item data from the storage medium. Then, using the read icon data and composite icon data, the processor 81 generates the list image including the icon images of the items possessed by the player character. Next to step S41, the process in step S42 is executed.

In step S42, the processor 81 obtains the operation data indicating an instruction performed by the player. The process in step S42 is similar to the process in step S1. Next to step S42, the process in step S43 is executed.

In step S43, based on the operation data obtained in step S42, the processor 81 determines whether or not a movement instruction to move the cursor included in the list image has been performed by the player. When the determination result in step S43 is positive, the process in step S44 is executed. When the determination result in step S43 is negative, the process in step S44 is skipped, and the process in step S45 is executed.

In step S44, the processor 81 changes the position of the cursor in the list image, in response to the movement instruction. That is, the processor 81 changes information indicating the position of the cursor in the list image so as to switch the icon image designated by the cursor among the icon images included in the list image. In addition, the processor 81 changes the character image, the name image, and the explanation image included in the list image, to the images indicating the contents regarding the equipment item or the composite equipment item indicated by the icon image designated by the moved cursor. According to the process in step S44, the position of the cursor in the list image is shifted and displayed, and the contents of the character image, the name image, and the explanation image are updated and displayed, in response to the process in step S41 being executed next. Next to step S44, the process in step S45 is executed.

In step S45, based on the operation data obtained in step S42, the processor 81 determines whether or not the composition cancel instruction has been performed by the player. When the determination result in step S45 is positive, the process in step S46 is executed. When the determination result in step S45 is negative, the processes in steps S46 to S48 are skipped, and the process in step S49 described later is executed.

In step S46, the processor 81 changes the items possessed by the player character. Specifically, the processor 81 updates the possessed item data stored in the memory so that the composite equipment item regarding the composition cancel instruction (i.e., the composite equipment item designated by the cursor when the composition cancel instruction was performed) is deleted from the items possessed by the player character, and the equipment item as the origin of the composite equipment item is added to the items possessed by the player character. Next to step S46, the process in step S47 is executed.

In step S47, the processor 81 changes the icon image designated by the cursor in the list image. That is, the processor 81 changes the icon image designated by the cursor, from the icon image of the composite equipment item to the icon image of the equipment item as the origin of the composite equipment item. In addition, the processor 81 changes the character image, the name image, and the explanation image included in the list image so that these images indicate the contents regarding the equipment item as the origin of the composite equipment item. According to the process in step S47, the content of the icon image designated by the cursor is changed and displayed, and the contents of the character image, the name image, and the explanation image are updated and displayed, in response to the process in step S41 being executed next. Next to step S47, the process in step S48 is executed.

In step S48, the processor 81 deletes, from the memory, the composite item data of the composite equipment item regarding the composition cancel instruction. Next to step S48, the process in step S49 is executed.

In step S49, the processor 81 determines whether or not to end the display of the list image. For example, when the player has performed a predetermined operation input to end the display of the list image, the processor 81 determines to end the display. When the determination result in step S49 is negative, the process in step S41 is again executed. Thereafter, a series of processes in steps S41 to S49 is repeatedly executed until it is determined in step S49 to end the display. When the determination result in step S49 is positive, the processor 81 ends the list processing shown in FIG. 32. When the list processing has ended, the processor 81 resumes the field processing described above (FIG. 30).

[4. Function and Effect of Exemplary Embodiment, and Modifications]

A game program according to the exemplary embodiment has a configuration (first configuration) that causes a computer (e.g., the processor 81) of an information processing apparatus (e.g., the game apparatus 2) to execute the following processes.

A process of controlling a player character, based on an operation input (steps S26, S28, S30, S31).

A process of generating a first composite equipment item in response to a first instruction (e.g., a composition instruction) based on an operation input so that a first equipment item (e.g., the aforementioned target equipment item) and a first item (e.g., the aforementioned target material item) are replaced with the first composite equipment item, the first equipment item being designated from among a plurality of equipment items that the player character possesses and is able to equip and use, the first item being designated from among a plurality items present in a virtual space, the first composite equipment item being obtained by compositing the first equipment item object and the first item object, the player character possessing the first composite equipment item, and being able to equip and use the first composite equipment item (step S25).

Here, each item is associated in advance with pieces of information on at least a name of the item and an effect at composition (i.e., property) of the item (FIG. 12). Each equipment item is associated in advance with pieces of information on at least a name, a type, and performance (or property) of the equipment item in advance (FIG. 14).

The game program according to the exemplary embodiment is configured to cause the computer of the information processing apparatus to further execute the following processes, in response to the first instruction.

A process of generating, as a name of the first composite equipment item, a name composed of a first part, a second part following the first part, and a third part following the second part, based on a combination of the first item and the first equipment item, according to (a) to (c) as follows (step S8):

(a) determining the first part to be a name representing the first item (e.g., a name or a shortened name of a material item), or a name representing an effect at composition of the first item;

(b) determining the second part to be a predetermined postpositional particle or a predetermined suffix (e.g., "-tipped" or "-attached"), or to be omitted;

(c) determining the third part to be a name (e.g., the type name) representing a type of the first equipment item, or a name (e.g., the post-composition name) according to a combination of an effect at composition associated with the first item and a type associated with the first equipment item (step S8).

A process of causing the player character to possess the first composite equipment item (step S6)

The "name according to the combination of the effect at composition associated with the first item and the type associated with the first equipment item" described above is, for example, a name that is set (more specifically, set in advance) for each combination of the effect at composition and the type, like the post-composition name described above (see FIG. 13).

According to the first configuration, since a new composite equipment item can be generated by compositing an item and an equipment item, many types of items are allowed to appear in the game. Furthermore, according to the above configuration, the composite equipment item can be automatically named based on the combination of the item and the equipment item to be composited. Thus, the amount of data that is prepared in advance as data indicating the name of the item, can be reduced.

A game program according to the exemplary embodiment has a configuration (second configuration) that causes a computer (e.g., the processor 81) of an information processing apparatus (e.g., the game apparatus 2) to execute the following processes.

A process of controlling a player character, based on an operation input (steps S26, S28, S30, S31).

A process of generating a first composite equipment item in response to a first instruction (e.g., a composition instruction) based on an operation input so that a first equipment item (e.g., the aforementioned target equipment item) and a first item (e.g., the aforementioned target material item) are replaced with the first composite equipment item, the first equipment item being designated from among a plurality of equipment items that the player character possesses and is able to equip and use, the first item being designated from among a plurality items present in a virtual space, the first composite equipment item being obtained by compositing the first equipment item object and the first item object, the player character possessing the first composite equipment item, and being able to equip and use the first composite equipment item (step S25).

A process of causing the player character to be equipped with the first composite equipment item in response to the first instruction (step S6).

A process of generating a three-dimensional model of the first composite equipment item, based on a three-dimensional model of the first equipment item and a three-dimensional model of the first item, in response to the first instruction (step S9).

A process of imaging, with a virtual camera, the three-dimensional model of the first composite equipment item to generate and store an icon image of the first composite equipment item, in response to the first instruction (step S10).

A process of displaying a list image of equipment items and composite equipment items possessed by the player character so as to include icon images of the items, in response to a second instruction (e.g., a list display instruction) based on an operation input, in response to the first instruction (step S41).

According to the second configuration, since a new composite equipment item can be generated by compositing an item and an equipment item, many types of items are allowed to appear in the game. Furthermore, according to the second configuration, since the icon images of the composite equipment items to be displayed in the list image can be generated, it is not necessary to prepare in advance data of the icon images. Thus, the amount of data of icon images can be reduced.

Furthermore, according to the second configuration, an icon image is generated by using a three-dimensional model, of a composite equipment item, that is generated based on three-dimensional models of original items. Here, for example, a case where an icon image of a composite equipment item is generated by using two-dimensional images (e.g., icon images) of original items, is considered. In this case, the items cannot be turned in various orientations on the two-dimensional images when the items are composited. Therefore, it is not possible to correctly represent the appearance of the composite equipment item that is generated by combining the items turned in predetermined orientation. Meanwhile, according to the second configuration, since the three-dimensional model of the composite equipment item is generated by using the three-dimensional models of the items, it is possible to generate an icon image that correctly represents the appearance of the composite equipment item.

In other embodiments, an icon image of a composite equipment item may be generated by using two-dimensional images (e.g., icon images) of original items.

According to a configuration obtained by combining the first configuration with the second configuration, a name and an icon image of a composite equipment item can be automatically generated. Therefore, the information processing system need not prepare in advance data for the name and the icon image of the composite equipment item, thereby further reducing the amount of data that the information processing system should prepare in advance.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the other information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other components and need not execute other processes.

The exemplary embodiment can be used as, for example, a game system and a game program, for the purpose of, for example, allowing many types of items to appear in a game, and automatically naming each item.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable storage media having stored therein instructions that, when executed, cause a processor to execute game processing comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality item objects present in a virtual space, the first composite equipment item object being obtained by compositing the first equipment item object and the first item object, the player character possessing the first composite equipment item object, and being able to equip and use the first composite equipment item object, each item object being associated in advance with pieces of information on at least a name of the item object and an effect at composition of the item object, each equipment item object being associated in advance with pieces of information on at least a name, a type, and performance of the equipment item object;

generating, in response to the first instruction, a name composed of a first part, a second part following the first part, and a third part following the second part, as a name of the first composite equipment item object, the generating the name including, determining the first part to be a name representing the first item object, or a name representing the effect at composition of the first item object, based on a combination of the first item object and the first equipment item object, determining the second part to be a predetermined postpositional particle or a predetermined suffix added to the first part, or to be omitted, based on the combination, and determining the third part to be a name representing a type of the first equipment item object, or a name according to a combination of the effect at composition associated with the first item object and the type associated with the first equipment item object, based on the combination; and causing the player character to possess the first composite equipment item object, in response to the first instruction, wherein the first part, the second part, and the third part are determined based on a naming rule that is set in advance and corresponds to a pattern that matches the combination of the first item object and the first equipment item object, among a plurality of patterns that are set in advance regarding combinations of any of the pieces of information associated with the item object and any of the pieces of information associated with the equipment item object wherein the plurality of patterns are given a priority order, and the first part, the second part, and the third part are determined based on the naming rule corresponding to a pattern that matches the combination of the first item object and the first equipment item object and is specified based on the priority order, among the plurality of patterns.

2. The one or more non-transitory computer-readable storage media according to claim 1, wherein each of the plurality of patterns is set as a pattern of a combination of the information on the effect at composition associated with the item object, and any of the pieces of information associated with the equipment item object.

3. The one or more non-transitory computer-readable storage media according to claim 2, wherein the game processing further comprises generating an effect according to the effect at composition associated with the first item object, when the player character uses the first composite equipment item object, based on an operation input.

4. The one or more non-transitory computer-readable storage media according to claim 3, wherein a first pattern and a second pattern, among the plurality of patterns, have the same information on the effect at composition, and have different pieces of information associated with the equipment item object, and the naming rules corresponding to the first pattern and the second pattern have the same rule for determining the first part, and have different rules for determining the third part.

5. The one or more non-transitory computer-readable storage media according to claim 3, wherein at least one of the plurality of equipment item objects is able to be composited with the first equipment item object, as the first item object.

6. The one or more non-transitory computer-readable storage media according to claim 1, wherein the game processing further comprises displaying, in response to a second instruction based on an operation input, a list image of the equipment item objects and the composite equipment item objects which are possessed by the player character such that the name of at least a designated equipment item object or a designated composite equipment item object is displayed.

7. The one or more non-transitory computer-readable storage media according to claim 6, wherein the list image is displayed such that the names of the item object and the equipment item object, which are origins of at least the designated composite equipment item object, are further included in the list image, in addition to the name of the composite equipment item object.

8. An information processing system comprising:

at least one processor; and at least one memory storing instructions that, when executed, cause the information processing system to execute game processing comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality item objects present in a virtual space, the first composite equipment item object being obtained by compositing the first equipment item object and the first item object, the player character possessing the first composite equipment item object, and being able to equip and use the first composite equipment item object, each item object being associated in advance with pieces of information on at least a name of the item object and an effect at composition of the item object, each equipment item object being associated in advance with pieces of information on at least a name, a type, and performance of the equipment item object;

generating, in response to the first instruction, a name composed of a first part, a second part following the first part, and a third part following the second part, as a name of the first composite equipment item object, the generating the name including, determining the first part to be a name representing the first item object, or a name representing the effect at composition of the first item object, based on a combination of the first item object and the first equipment item object, determining the second part to be a predetermined postpositional particle or a predetermined suffix added to the first part, or to be omitted, based on the combination, and determining the third part to be a name representing a type of the first equipment item object, or a name according to a combination of the effect at composition associated with the first item object and the type associated with the first equipment item object, based on the combination; and causing the player character to possess the first composite equipment item object, in response to the first instruction, wherein the first part, the second part, and the third part are determined based on a naming rule that is set in advance and corresponds to a pattern that matches the combination of the first item object and the first equipment item object, among a plurality of patterns that are set in advance regarding combinations of any of the pieces of information associated with the item object and any of the pieces of information associated with the equipment item object, wherein the plurality of patterns are given a priority order, and the first part, the second part, and the third part are determined based on the naming rule corresponding to a pattern that matches the combination of the first item object and the first equipment item object and is specified based on the priority order, among the plurality of patterns.

9. The information processing system according to claim 8, wherein each of the plurality of patterns is set as a pattern of a combination of the information on the effect at composition associated with the item object, and any of the pieces of information associated with the equipment item object.

10. The information processing system according to claim 9, wherein the game processing further comprises generating an effect according to the effect at composition associated with the first item object, when the player character uses the first composite equipment item object, based on an operation input.

11. The information processing system according to claim 10, wherein a first pattern and a second pattern, among the plurality of patterns, have the same information on the effect at composition, and have different pieces of information associated with the equipment item object, and the naming rules corresponding to the first pattern and the second pattern have the same rule for determining the first part, and have different rules for determining the third part.

12. The information processing system according to claim 10, wherein at least one of the plurality of equipment item objects is able to be composited with the first equipment item object, as the first item object.

13. The information processing system according to claim 8, wherein the game processing further comprises displaying, in response to a second instruction based on an operation input, a list image of the equipment item objects and the composite equipment item objects which are possessed by the player character such that the name of at least a designated equipment item object or a designated composite equipment item object is displayed.

14. The information processing system according to claim 13, wherein the list image is displayed such that the names of the item object and the equipment item object, which are origins of at least the designated composite equipment item object, are further included in the list image, in addition to the name of the composite equipment item object.

15. An information processing apparatus comprising:

at least one processor; and a storage medium storing executable instructions that, when executed, cause the information processing apparatus to execute game processing comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality item objects present in a virtual space, the first composite equipment item object being obtained by compositing the first equipment item object and the first item object, the player character possessing the first composite equipment item object, and being able to equip and use the first composite equipment item object, each item object being associated in advance with pieces of information on at least a name of the item object and an effect at composition of the item object, each equipment item object being associated in advance with pieces of information on at least a name, a type, and performance of the equipment item object;

generating, in response to the first instruction, a name composed of a first part, a second part following the first part, and a third part following the second part, as a name of the first composite equipment item object, the generating the name including, determining the first part to be a name representing the first item object, or a name representing the effect at composition of the first item object, based on a combination of the first item object and the first equipment item object, determining the second part to be a predetermined postpositional particle or a predetermined suffix added to the first part, or to be omitted, based on the combination, and determining the third part to be a name representing a type of the first equipment item object, or a name according to a combination of the effect at composition associated with the first item object and the type associated with the first equipment item object, based on the combination; and causing the player character to possess the first composite equipment item object, in response to the first instruction, wherein the first part, the second part, and the third part are determined based on a naming rule that is set in advance and corresponds to a pattern that matches the combination of the first item object and the first equipment item object, among a plurality of patterns that are set in advance regarding combinations of any of the pieces of information associated with the item object and any of the pieces of information associated with the equipment item object, wherein the plurality of patterns are given a priority order, and the first part, the second part, and the third part are determined based on the naming rule corresponding to a pattern that matches the combination of the first item object and the first equipment item object and is specified based on the priority order, among the plurality of patterns.

16. A computer-implemented method comprising:

controlling a player character, based on an operation input;

generating a first composite equipment item object in response to a first instruction based on an operation input so that a first equipment item object and a first item object are replaced with the first composite equipment item object, the first equipment item object being designated from among a plurality of equipment item objects that the player character possesses and is able to equip and use, the first item object being designated from among a plurality item objects present in a virtual space, the first composite equipment item object being obtained by compositing the first equipment item object and the first item object, the player character possessing the first composite equipment item object, and being able to equip and use the first composite equipment item object, each item object being associated in advance with pieces of information on at least a name of the item object and an effect at composition of the item object, each equipment item object being associated in advance with pieces of information on at least a name, a type, and performance of the equipment item object;

generating, in response to the first instruction, a name composed of a first part, a second part following the first part, and a third part following the second part, as a name of the first composite equipment item object, the generating the name including, determining the first part to be a name representing the first item object, or a name representing the effect at composition of the first item object, based on a combination of the first item object and the first equipment item object, determining the second part to be a predetermined postpositional particle or a predetermined suffix added to the first part, or to be omitted, based on the combination, and determining the third part to be a name representing a type of the first equipment item object, or a name according to a combination of the effect at composition associated with the first item object and the type associated with the first equipment item object, based on the combination; and causing the player character to possess the first composite equipment item object, in response to the first instruction, wherein the first part, the second part, and the third part are determined based on a naming rule that is set in advance and corresponds to a pattern that matches the combination of the first item object and the first equipment item object, among a plurality of patterns that are set in advance regarding combinations of any of the pieces of information associated with the item object and any of the pieces of information associated with the equipment item object, wherein the plurality of patterns are given a priority order, and the first part, the second part, and the third part are determined based on the naming rule corresponding to a pattern that matches the combination of the first item object and the first equipment item object and is specified based on the priority order, among the plurality of patterns.

\* \* \* \* \*